(12) United States Patent
Shiono

(10) Patent No.: US 8,054,727 B2
(45) Date of Patent: Nov. 8, 2011

(54) INFORMATION RECORDING MEDIUM AND METHOD FOR MANUFACTURING THE SAME, AND OPTICAL INFORMATION RECORDING/REPRODUCING DEVICE

(75) Inventor: Teruhiro Shiono, Osaka (JP)

(73) Assignee: Panasonic Corporation, Osaka (JP)

( * ) Notice: Subject to any disclaimer, the term of this patent is extended or adjusted under 35 U.S.C. 154(b) by 607 days.

(21) Appl. No.: 12/093,121

(22) PCT Filed: Nov. 8, 2006

(86) PCT No.: PCT/JP2006/322293
§ 371 (c)(1),
(2), (4) Date: May 8, 2008

(87) PCT Pub. No.: WO2007/055249
PCT Pub. Date: May 18, 2007

(65) Prior Publication Data
US 2009/0161502 A1    Jun. 25, 2009

(30) Foreign Application Priority Data

Nov. 8, 2005    (JP) .................................. 2005-323209

(51) Int. Cl.
*G11B 7/00*    (2006.01)
(52) U.S. Cl. ......................... 369/94; 369/44.37; 369/118
(58) Field of Classification Search ........................ None
See application file for complete search history.

(56) References Cited

U.S. PATENT DOCUMENTS

| | | | | |
|---|---|---|---|---|
| 6,009,065 | A * | 12/1999 | Glushko et al. .......... | 369/112.22 |
| 7,763,439 | B2 * | 7/2010 | Meltola et al. ............... | 435/7.92 |
| 2005/0157629 | A1 * | 7/2005 | Shiono et al. .............. | 369/275.2 |

(Continued)

FOREIGN PATENT DOCUMENTS

JP    7-326074    12/1995

(Continued)

OTHER PUBLICATIONS

International Search Report issued Feb. 13, 2007 in International (PCT) Application No. PCT/JP2006/322293.

(Continued)

*Primary Examiner* — Joseph Haley
(74) *Attorney, Agent, or Firm* — Wenderoth, Lind & Ponack, L.L.P.

(57) ABSTRACT

An information recording medium of the present invention is an information recording medium characterized by and including a substrate; and a recording unit capable of recording three-dimensionally a recording pit on the substrate; in which the recording unit has n number of recording layers (n is an integer equal to or larger than 4) and a plurality of intermediate layers laminated with the recording layers one on another; the recording is performed by the condensed recording light using a two photon absorption phenomenon; each of the plurality of intermediate layers is substantially transparent at a wavelength $\lambda 1$ of the recording light and at a wavelength $\lambda 2$ of the reproduction light, respectively; the light intensity of the recording light incident into the recording layer nearest to the substrate is more than 0.707 fold as much as the light intensity of the recording light incident into the recording layer farthest from the substrate. The information recording medium is an information recording medium capable of maintaining a precise and good recording accuracy at the recording layer positioned lower away from the objective lens while it secures the focus servo reflected light.

25 Claims, 13 Drawing Sheets

U.S. PATENT DOCUMENTS

2006/0072437 A1    4/2006    Shiono et al.
2007/0053279 A1*   3/2007    Magnitskii et al. ........ 369/275.1

FOREIGN PATENT DOCUMENTS

| | | |
|---|---|---|
| JP | 2004-149501 | 5/2004 |
| JP | 2004-259369 | 9/2004 |
| JP | 2005-92074 | 4/2005 |
| JP | 2005-222568 | 8/2005 |
| WO | 2004/036569 | 4/2004 |
| WO | 2004/107040 | 12/2004 |

OTHER PUBLICATIONS

Yoshimasa Kawata, "Three-dimensional Optical Memory using a Femt-second Laser", Optronics No. 11, pp. 138-142 (2001).

Yoshimasa Kawata et al., "Three-dimensional optical memory using an organic multilayered medium", Optics Japan 2000 Extended Abstract, pp. 95-96 (2000).

\* cited by examiner

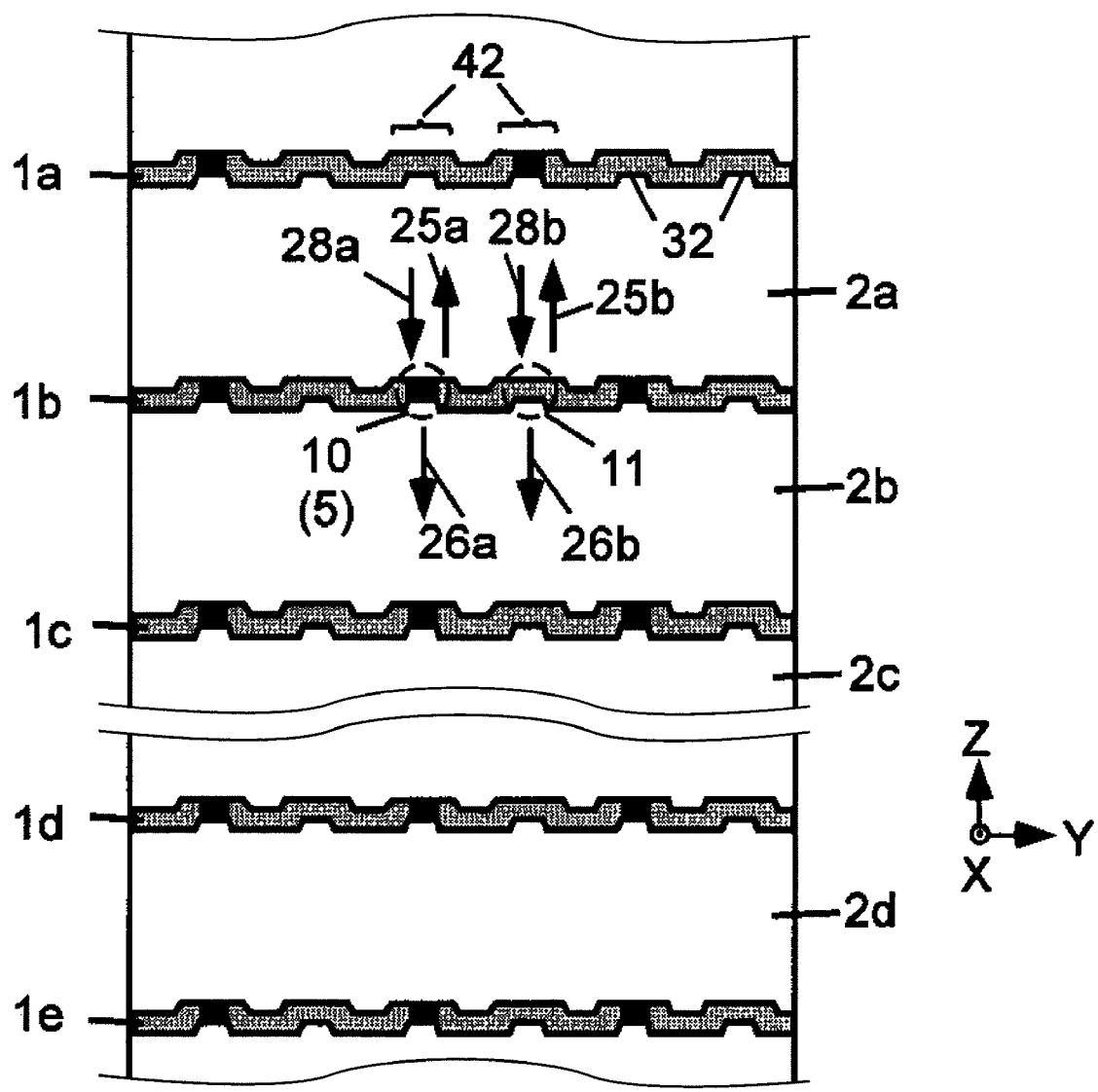

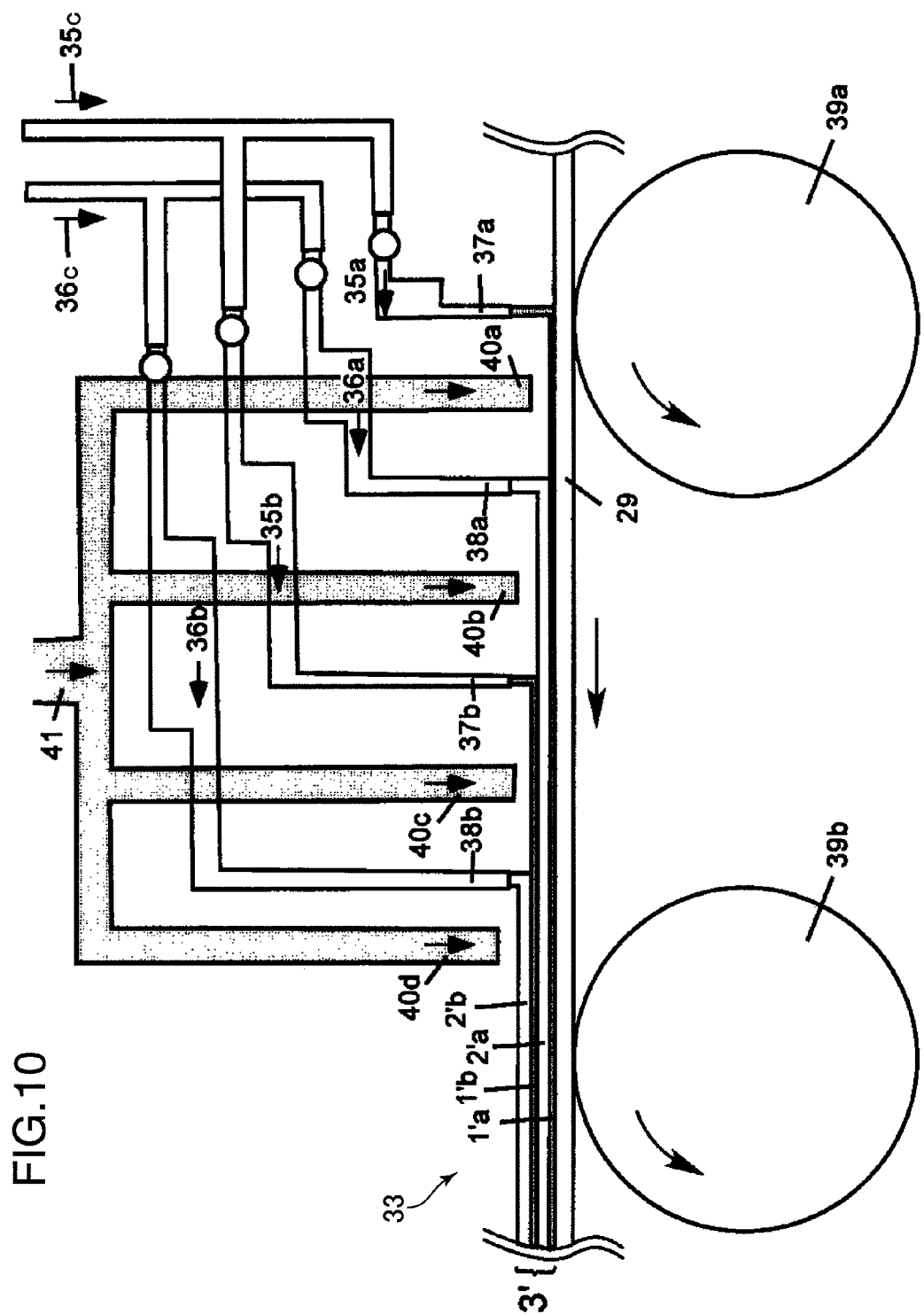

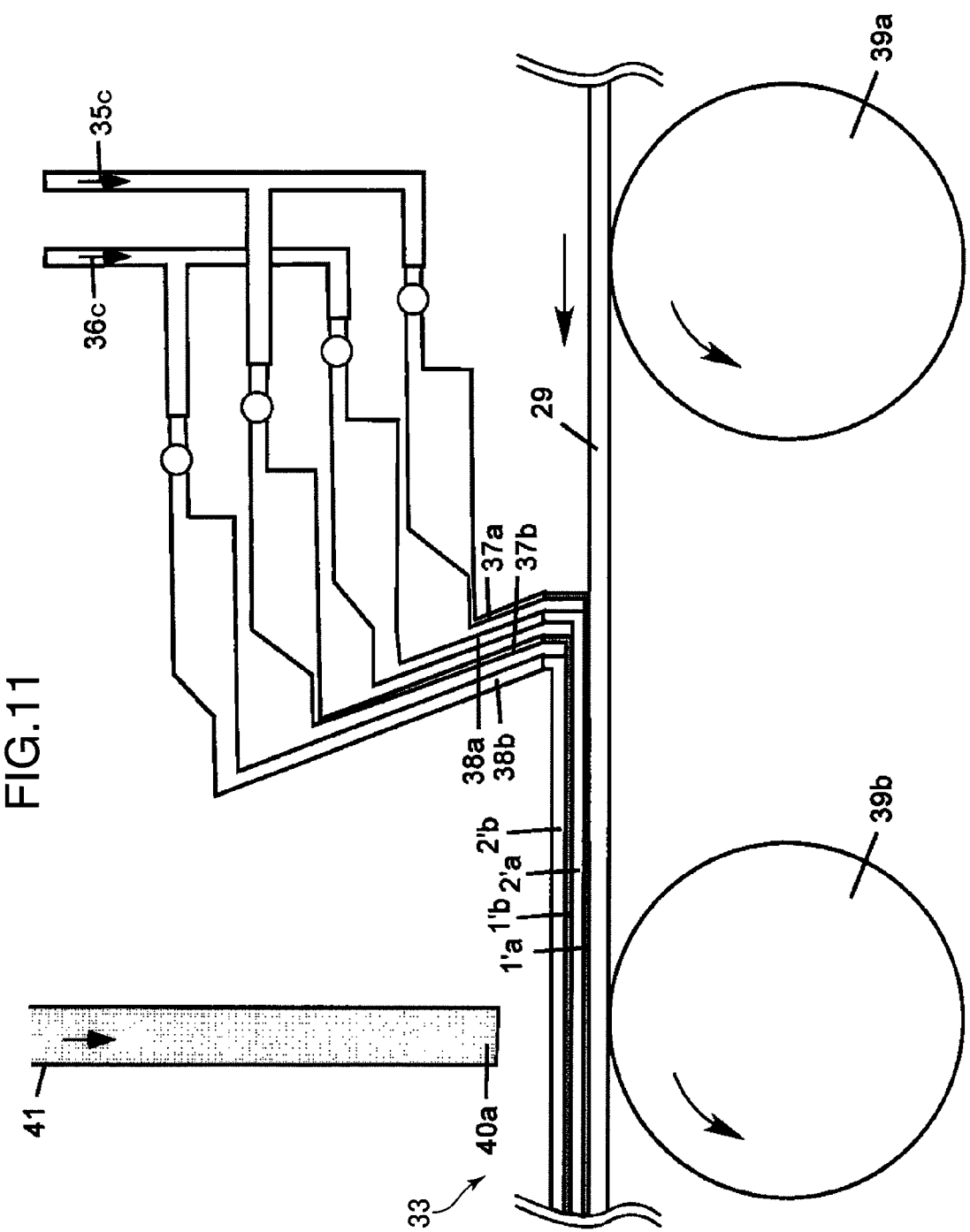

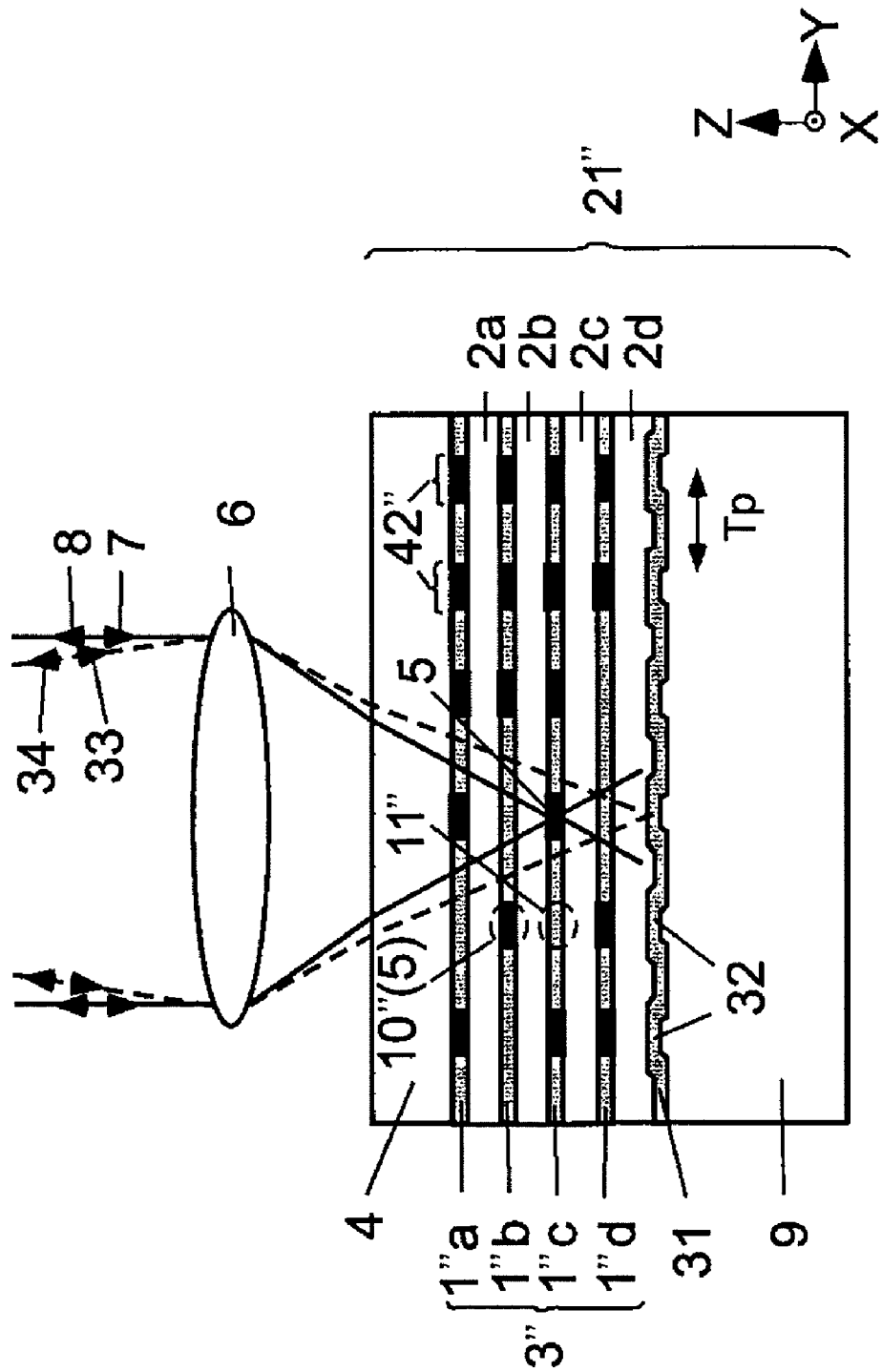

INFORMATION RECORDING MEDIUM AND METHOD FOR MANUFACTURING THE SAME, AND OPTICAL INFORMATION RECORDING/REPRODUCING DEVICE

TECHNICAL FIELD

The present invention relates to an information recording medium capable of recording three-dimensionally a recording pit as information pits using a two photon absorption phenomenon and a method for manufacturing the same, and an optical information recording/reproducing device. More specifically, it relates to the information recording medium capable of keeping good recording accuracy at high precision by using the two photon absorption phenomenon in a lower recording layer positioned away from an objective lens while securing a sufficient amount of focus servo reflected light, a method for manufacturing the same, and an optical information recording/reproducing device used for recording/reproducing the information recording medium.

BACKGROUND ART

Optical disks such as CDs (compact disks), DVDs (digital versatile disks), optical card memories, and the like are used as an optical information recording medium.

In order to achieve a large capacity of the recording information, Non-patent Literature 1 discloses an information recording medium to be recorded by using a two photon absorption phenomenon in which a plurality of recording layers 101 are three-dimensionally laminated one on another as shown in FIG. 13.

The information recording medium 121 includes a transparent glass substrate 104 and recording layers 101a-101d made of an urethane-urea copolymer material which is a photon-mode recording material, and further includes intermediate layers 101a-102c made of PVA (polyvinyl alcohol) film and PMMA (poly(methyl methacrylate)). The recording layers and the intermediate layers are laminated one on another on the transparent substrate 104.

Upon recording, recording light 122a having a large peak-power of a wavelength of 0.790 Mm irradiated from a titanium-sapphire laser as a recording light source 120a passes through a beam splitter 118a, its beam radius is expanded by a beam expander 123, further passes through a beam splitter 118b, and converges (convergent light 107) to a desired recording layer 101c of a three-dimensionally recordable/reproducible multi-layered information recording medium 121 by an objective lens 106. When the convergent light 107 is focused, only a portion of light having a high optical power density (focal point and therearound) will be absorbed as if a wavelength of the recording light becomes a half length by a two photon absorption process, thereby forming a recording pit 105. Therefore, even if the number of the recording layers increases, the other recording layers are still substantially transparent to the recording light and two photon absorption occurs only at a predetermined recording position. As a result thereof, the recording light is prevented from attenuation to enable satisfactory recording at a lower recording layer positioned away from the objective lens 106.

On the other hand, upon reproduction, the reproduction light 122b having a small peak-power of a wavelength of 0.6328 µM irradiated from a He—Ne laser of a reproduction light source 120b is converged (convergent light 107) in a similar manner onto the recording pit 105 of the desired recording layer 101c by the objective lens 106. Then, the reflected light is bent in a Y axis direction by means of a beam splitter 118b, converged by a detection lens 111 to pass through a pin hole 114 positioned at a focal point of the detection lens 111, and thereby detected by a light detector 119, resulting in signals being reproduced.

In an optical disk recording/reproducing apparatus using a conventional single photon absorption phenomenon, a focus servo is performed, upon recording or reproducing, so as to have recording light or reproduction light from a light source converge precisely onto a disk through the objective lens. Although it is not discussed in the Non-patent Literature 1, it is preferable that the focus servo is performed when the recording pit 105 is reproduced in an information recording medium 121 disclosed in Non-patent Literature 1. More specifically, for example, when recording light 122a or reproduction light 122b is irradiated onto the information recording medium 121, if reflected light having a certain intensity can be acquired from the recording layer 101c, the recording light 122a or the reproduction light 122b can be precisely converged onto the desired recording layer 101c by using the reflected light as a focus servo light.

However, according to a study of inventors of the present invention, when the above-described focus servo is performed on the information recording medium 121 disclosed in Non-patent Literature 1, it is considered that there will be the following problems.

That is, in order to precisely converge the recording light or the reproduction light onto the desired recording layer 101c upon recording or reproducing of the information recording medium 121, focus servo reflected light of a constant intensity is required at each of the recording layers 101 with regard to both of the wavelength of the recording light and the wavelength of the reproduction light. The larger the light intensity of the reflected light becomes, the easier the focus servo becomes.

An information recording medium 121 is provided with a plurality of recording layers 101 in a multi-layered manner in order to form a recording pit three-dimensionally. The recording light and the reproduction light are reflected and absorbed not only by the desired recording layer 101c but also by each of the recording layers 101a-101d. Therefore, due to the reflection and absorption by each of the recording layers 101a-101d, the light intensity of the recording light and the reproduction light will be lowered before they reach the lowermost layer farthest from the objective lens (101d in FIG. 13). Especially, if the number of the recording layers becomes equal to or more than 4 layers, the light intensity will be remarkably lowered. Accordingly, if one attempts to obtain a sufficient reflected light for the sake of the focus servo of each of the recording layers by using the recording light or the reproduction light, transmitted light of the recording light or the reproduction light will decrease, and therefore, such a problem will occur that a good recording pit will not be formed up to the lowermost recording layer in a recording process which requires a large amount of light such as required in the two photon absorption process. Especially, in the case of the two photon absorption recording, the recording sensitivity remarkably decreases in accordance with lowering of the amount of recording light upon, in comparison with a single photon absorption recording. That is, in the case of the single photon absorption recording, the recording sensitivity is proportional to the light intensity, whereas in the case of the two photon absorption recording, the recording sensitivity is proportional to a square characteristic of the light intensity. In other words, for example, if the amount of the recording light is multiplied by 0.5, the recording sensitivity is multiplied by 0.5 in the single photon absorption, whereas the recording sensitivity is multiplied by 0.25 in the two photon absorption recording, which is a square of the recording sensitivity in the single photon absorption. Consequently, it is difficult for the conventional information recording medium of Non-patent Literature 1 to secure a sufficient amount of light until it reaches the lowermost recording layer upon recording while securing the focus servo reflected light. Non-linear recording necessitates a semiconductor laser having a high peak-power of, for example, more than several hundreds mW to 1 W as a recording light source, such that there is almost no actual room for power adjustment of the light source actually to the higher output power. As such, when the lower recording layer is recorded in order for the recording pit to be three-dimensionally recorded in a recording unit, it is often difficult to raise the power of the recording light source to more than the power for recording an upper recording layer.

[Non-patent Literature 1]
Yoshimasa KAWATA: Three-dimensional Optical Memory using a Femto-second Laser, OPTRONICS No. 11 pp. 138-142 (2001)

DISCLOSURE OF THE INVENTION

The present invention was made in order to resolve the problems in the above-described conventional technique and is directed to provide an information recording medium capable of keeping good recording accuracy at high precision in a lower recording layer away from an objective lens, especially, while securing the focus servo reflected light, in an information recording medium of which a recording pit as an information pit is three-dimensionally recorded by using a two photon absorption phenomenon and a method for manufacturing the same, and an optical information recording/reproducing device to be used for recording/reproducing the information recording medium.

According to an aspect of the present invention, an information recording medium includes a substrate; and a recording unit capable of recording three-dimensionally a recording pit on the substrate; in which the recording unit includes n number of recording layers (n is an integer equal to or larger than 4) and a plurality of intermediate layers laminated with recording layers one on another; the recording is performed by converged recording light using a two photon absorption phenomenon; each of the plurality of intermediate layers is substantially transparent at a wavelength λ1 of recording light and a wavelength λ2 of reproduction light; and the light intensity of the recording light incident onto a recording layer nearest to the substrate is equal to or more than 0.707 fold as much as the light intensity of the record light incident onto the recording layer farthest from the substrate.

With the above-described configuration, in the information recording medium capable of recording three-dimensionally the recording pit using the two photon absorption phenomenon, the amount of light of the recording light can, especially, be prevented from lowering with regard to the lowermost recording layer away from the objective lens, such that a practical recording sensitivity can be secured for the lowermost recording layer even with a recording method according to a nonlinear phenomenon, and also can realize an information recording medium capable of providing a good recording condition to all of the recording layers while a focus servo is applied thereon.

The objects, the characteristics, the aspects, and the below-mentioned advantages will become clearer in view of the following detailed description and the accompanying drawings.

BRIEF DESCRIPTION OF THE DRAWINGS

FIG. 4 illustrates transmitted light and reflected light with regard to a desired recording layer of the information recording medium according to the first exemplary embodiment of the present invention.

FIG. 10 illustrates an application step and a drying step among the manufacturing process of the information recording medium according to the second exemplary embodiment of the present invention.

FIG. 11 illustrates an application step and a drying step among the manufacturing process of the information recording medium of another exemplary embodiment according to the second exemplary embodiment of the present invention.

FIG. 12 illustrates a configuration of an information recording medium and how to reproduce a signal of the information recording medium thereby according to a third exemplary embodiment of the present invention.

PREFERRED MODE FOR CARRYING OUT THE INVENTION

Figure 1A:
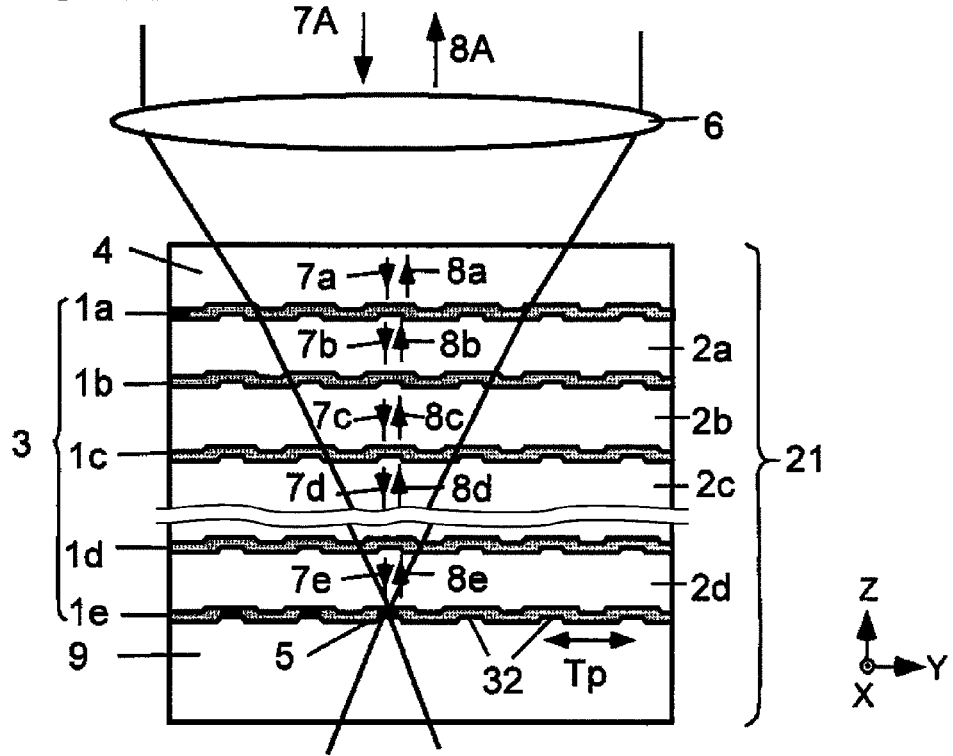
FIG. 1A illustrates a configuration of an information recording medium and how to record a signal onto the information recording medium according to a first exemplary embodiment of the present invention.

An information recording medium according to the present invention is characterized in that a two photon absorption phenomenon is used as a recording method of a recording pit in an information recording medium with a plurality of recording layers; and the light intensity of recording light incident upon a recording layer nearest to a substrate of the information recording medium is equal to or more than 0.707 fold as much as the light intensity of recording light incident upon a recording layer farthest from the substrate. In the present specification, recording layers at a side near to the substrate are referred to as lower layer side recording layers and recording layers farther from the substrate are referred to as upper layer side recording layers.

In a recording method of a recording pit using the two photon absorption phenomenon, an absorption will occur as if a wavelength became a half length only at a high optical power density portion in the recording layer upon recording, such that a change of an optical constant such as the refractive index occurs in the recording layer to thereby form the recording pit. By increasing the optical power density only at a predetermined recording portion, the change of the refractive index occurs only at the predetermined recording position but no change of the refractive index occurs at the other portions of the recording layer since the other portions are substantially transparent to the recording light. Therefore, even in the case of a multi-layered information recording medium including equal to or more than 4 recording layers, the recording light can be prevented from being attenuated even after it passes through a plurality of recording layers according to a recording method using the two photon absorption phenomenon and thus even the lowermost recording layer can be recorded sufficiently.

Meanwhile, a focus servo is required for the predetermined recording layer in order to enhance the optical power density only at a predetermined recording position. In such a focus servo, reflected light of the recording light at the predetermined recording layer is used.

In a conventional multi-layered information recording medium using a single photon absorption phenomenon as a recording method, the recording pit is formed by linear absorption of a recording wavelength, such that a high absorptivity is required for the recording light upon recording. It is also required to secure sufficient reflected light which can be used for focus servo. Therefore, in the multi-layered information recording medium using the single photon absorption phenomenon, it has been important to secure the absorptivity of the recording light upon recording and to secure sufficient reflected light for the sake of the focus servo.

The inventors of the present invention found that, in the information recording medium with a plurality of recording layers which is recorded by two photon absorption, sufficient recording can be provided to the lowermost recording layer of the information recording medium having equal to or more than 4 layers by keeping the recording sensitivity of the recording layer nearest to the substrate (the lowermost layer) being kept equal to or more than about 0.5 fold as much as the recording sensitivity of the recording layer farthest from the substrate at the incident side of the recording light (the uppermost layer). The inventors further found that a recording sensitivity of equal to or more than $(0.707)^2=0.499$ fold can be achieved as a result that the light intensity of the recording light incident onto the lowermost recording layer is made equal to or more than 0.707 fold as much as the light intensity of the recording light incident onto the uppermost recording layer. With the above-described configuration, the lowermost recording layer can be recorded sufficiently, and sufficient reflected light which can be used in the focus servo and a track servo can be acquired in the information recording medium with equal to or more than 4 layers.

Meanwhile, the fact that the light intensity of the recording light incident onto the lowermost recording layer is made equal to or more than 0.707 fold as much as the light intensity of the recording light incident onto the uppermost recording layer in the information recording medium can be confirmed in the following manner.

In other words, provided that the reflectance of the obverse surface of the information recording medium is p1, the reflectance of the rear surface is p2, the transmittance of the entire inside of the information recording medium is t1, and the number of recording layers is n, if collimated light having a wavelength identical to the recording light is vertically incident onto the information recording medium in order to measure the outgoing light intensity and thereby acquire the transmittance t2 of the entire information recording medium, the optical equation t2=(1−p1)t1(1−p2) is established. When the equation is expanded, it becomes t1=t2/{(1−p1)(1−p2)}. Also, the light intensity incident onto the lowermost layer becomes equivalent to the transmittance of n−1 layers, such that the value becomes $t1/0.707^{1/(n-1)}=t2/[\{(1-p1)(1-p2)\}0.707^{1/(n-1)}]$. If the value is equal to or more than 0.707 fold, it is so considered that the light intensity of the recording light incident onto the lowermost recording layer is equal to or more than 0.707 fold as much as the light intensity of the recording light incident onto the uppermost recording layer. Here, the reflectance p1 can be acquired from the refractive index of a material forming a protective layer (for example, UV-curable resin), and the reflectance p2 can be acquired from the refractive index of a material forming the substrate (for example, polycarbonate).

Further, in the case where the recording pit of the information recording medium with the n number of recording layers is recorded using the two photon absorption phenomenon, the transmittance T per recording layer at a wavelength λ1 of the recording light satisfies the relation $T \geq 0.707^{1/(n-1)}$, such that a good recording can be performed while the recording layers are applied with the focus servo without necessitating a large power adjustment of a recording light source or without necessitating any power adjustment. Further, up to about 30% of the output power of the recording light source is adjusted in accordance with the positions of the recording layers, thereby being capable of adjusting the recording sensitivity. Still further, the transmittance T of the recording layer is the rate of the transmitting light intensity with regard to the light intensity incident onto each of the recording layers, and thus shows an areal average value of the transmittance T1 of the below-described unrecorded region and the transmittance T2 of the recorded region.

First Exemplary Embodiment

FIG. 1 illustrates a configuration of the information recording medium and how to record/reproduce a signal of the information recording medium according to a first exemplary embodiment of the present invention.

As shown in FIG. 1A, the information recording medium 21 according to the first exemplary embodiment has a substrate 9 having, for example, a diameter of 12 cm and a thickness of 1.1 mm, and a recording unit 3 including n number of recording layers 1 formed on the substrate 9 (1a-1e are illustrated in FIG. 1A and each having a thickness of t). The recording unit 3 is provided with, for example, intermediate layers 2 (4 layers 2a-2d are illustrated in FIG. 1A), each having a thickness of $t_s$=3 to 10 μm between each of the recording layers 1, respectively, so as to have such a configuration that the recording layers 1 and the intermediate layers 2 are multi-laminated one on another. The incident side of the recording light and the reproduction light of the recording unit 3 may be further provided with a protective layer 4 having a thickness of, for example, between 50 and 100 μm. Since the protective layer 4 is provided with the recording unit 3, recording and reproduction can be performed even if there is some degree of dirt, dust, flaw, and/or the like on the information recording medium. Further, since the optical constant of the above predetermined recording layer (for example, 1e) is changed by irradiating recording light 7A onto the recording unit 3, three-dimensional recording can be performed.

According to the first exemplary embodiment, each of the recording layers 1 (1a-1e in FIG. 1A) has track grooves 32 for generating a track error signal for track servo by using a known push-pull method. The track pitch Tp of the track grooves 32 is, for example, about 0.59 μm, and the depth of the grooves is, for example, about 0.05 μm.

In the information recording medium 21 upon recording, as shown in FIG. 1A, the convergent light, which is the recording light 7A converged by an objective lens 6, is incident onto, for example, a track groove 32 which is a recording region of the recording layer 1e as a target layer. Then, if a diffracted light 8e of the reflected light from the track groove 32 (hereinafter simply referred to as the "diffracted light") is generated and detected by a light detector (not shown in FIG. 1A), the diffracted light 8e can be used as a focus servo error signal light or a track servo error signal light. According to the focus servo and the track servo using the diffracted light 8e, recording light 7e is accurately condensed at a track of the targeted recording layer 1e upon recording by the focus servo and the track servo using the diffracted light 8e to thereby change an optical constant, more preferably, the refractive index of the recording layer, in order for the recording pit 5 to be recorded.

Figure 1B:
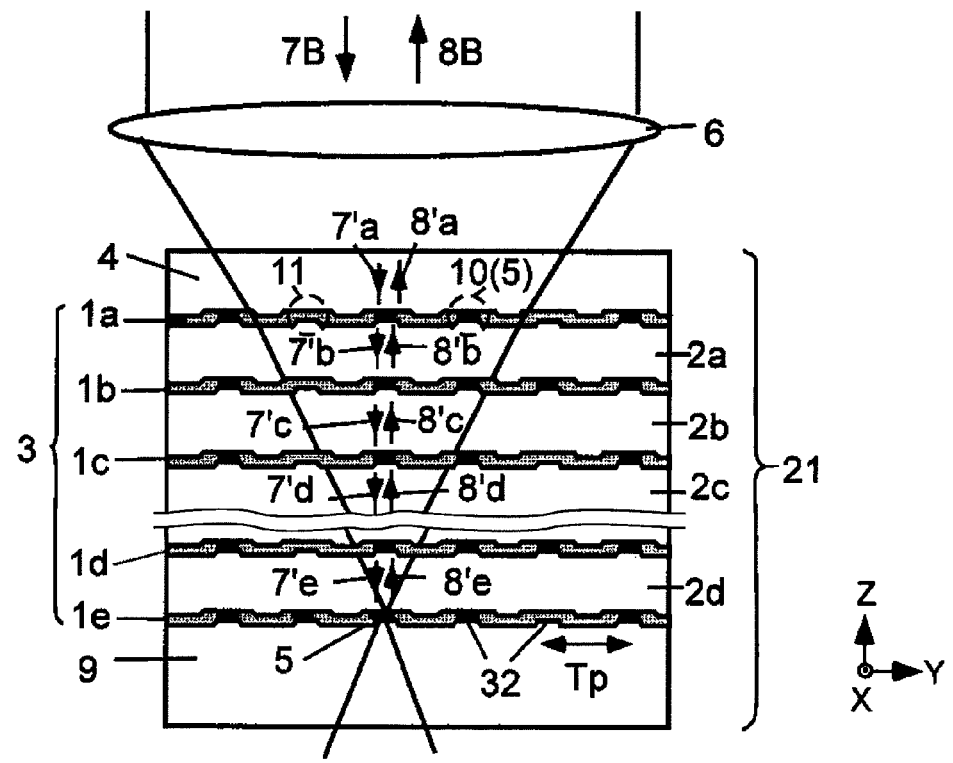
FIG. 1B illustrates the configuration of the information recording medium and how to reproduce the signal of the information recording medium according to the first exemplary embodiment of the present invention.

Similarly, as shown in FIG. 1B, the convergent light, which is the reproduction light 7B condensed by the objective lens 6 is incident into, for example, the recording layer 1e as the targeted layer upon reproduction. At this time, if a diffracted light 8'e of the reflected light from the track groove 32 of the recording layer 1e is detected by a light detector (not shown in FIG. 1B), the diffracted light 8'e can be also used as the focus servo error signal light or the track servo error signal light. According to the focus servo or the track servo using the diffracted light 8'e, the reproduction light is accurately condensed at the track 32 of the targeted recording layer 1e upon reproduction and a recorded signal is reproduced by using the diffracted light 8'e from the recording pit 5 as a recorded region.

The wavelength λ1 of the recording light 7A may be identical to or different from the wavelength λ2 of the reproduction light 7B. It is preferable, however, to use a semiconductor laser in order to achieve downsizing of the light source and decrease of cost. It is preferable to make the wavelength λ2 of the reproduction light smaller than the wave length λ1 of the recording light, since a high density can be achieved in accordance with the wavelength of the reproduction light. More specifically, it is preferable to use such recording light and reproduction light that the wavelength λ1 of the recording light satisfies the relation 0.73 μm≦λ1≦0.83 μm, and the wavelength λ2 of the reproduction light satisfies the relation 0.6 μm≦λ2≦0.7 μm. An example of the light source having the above-described wavelength includes a semiconductor laser which irradiates a wavelength of λ1=0.78 μm and a wavelength of λ2=0.66 μm.

When a light source having a wavelength of λ1=0.78 μm of the recording light is used, the recording material for forming the recording layer is to be such a material that the absorptivity becomes larger for a wavelength of 0.39 μm or of a range between 0.36 and 0.42 μm which is the wavelength of ½ of the wavelength λ1 or an adjacent wavelength (varies within ±0.03 μm) in comparison with the case in which absorptivity of the wavelength of λ1=0.78 μm to thereby perform a recording using the two photon absorption phenomenon.

Disregarding the number of layers n, when the transmittance T of each of the recording layers 1 satisfies the condition of $T \geq 0.707^{1/(n-1)}$, the light intensity of the recording light which is incident onto the lowermost recording layer 1e is equal to or more than 0.707 as much as the recording light incident onto the uppermost recording layer 1a. The lowering quantity of the light intensity of the recording light 7e at the recording layer 1e can be suppressed to equal to or less than about 30% (0.293 fold) of the light intensity of the recording light 7a at the uppermost layer. In this case, if two photon absorption recording is employed, the recording sensitivity of the lowermost recording layer 1e becomes equal to or more than half of the recording sensitivity of the uppermost recording layer 1a. Therefore, it becomes possible to perform a good recording while the focus servo is applied to all of the recording layers.

Figure 2:
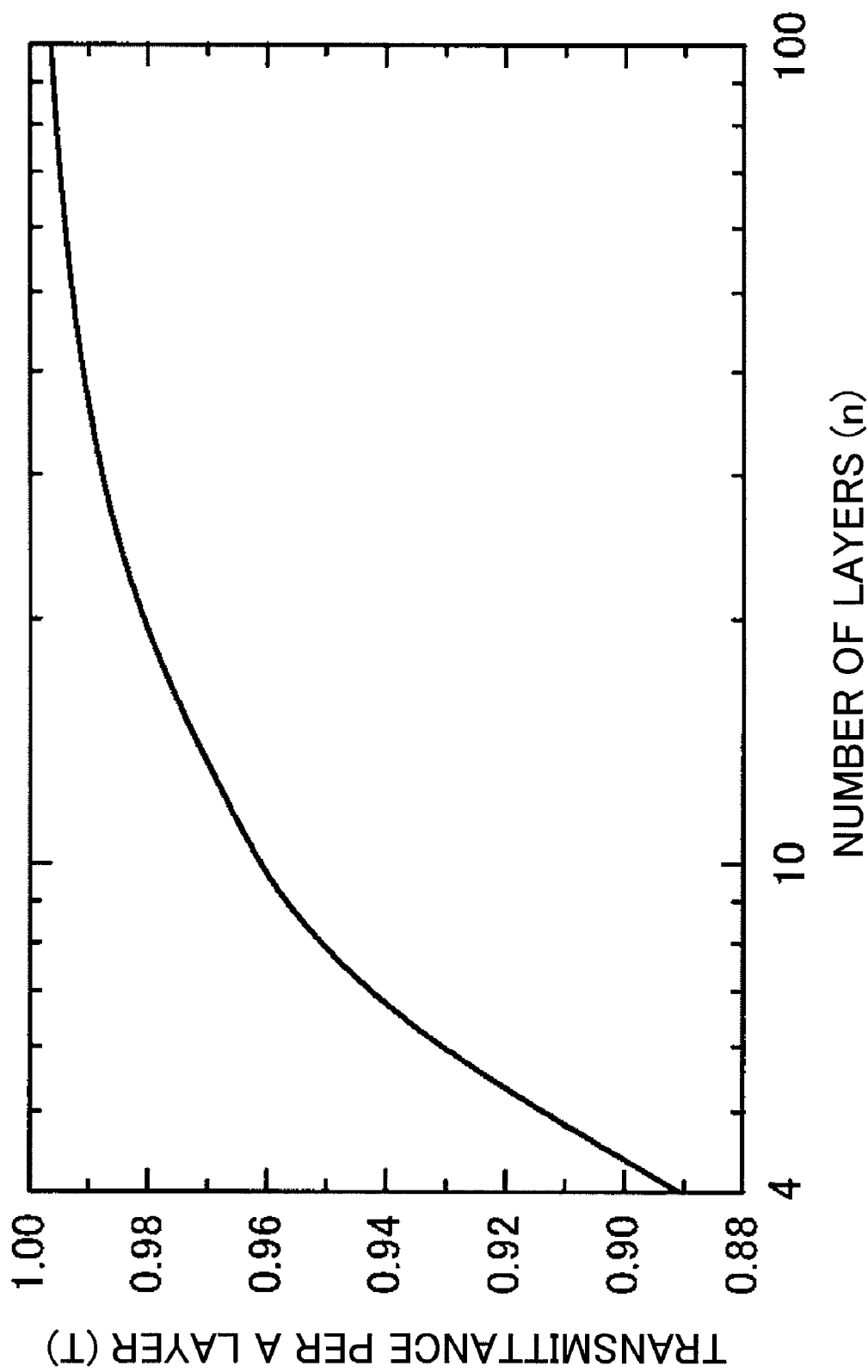
FIG. 2 is a graph showing a relationship between a transmittance per recording layer and the number of recording layers of the information recording medium according to the first exemplary embodiment of the present invention.

Here, FIG. 2 illustrates a graph showing a relationship between a transmittance per layer when the transmittance per recording layer becomes $T=0.707^{1/(n-1)}$ and the number of recording layers at the recording wavelength λ1 in the information recording medium with the recording unit including the n number of recording layers. For example, when n=4, T=0.8909; when n=6, T=0.9330; when n=8, T=0.9517; when n=10, T=0.9622; when n=20, T=0.9819; when n=40, T=0.9911, when n=50, T=0.9929; when n=100, T=0.9965; when n=200, T=0.9983; when n=208, T=0.9983, when n=300, T=0.9988; and when n=305, T=0.9989.

In the first exemplary embodiment, as shown in FIG. 1, the recording layers 1 are provided with the track grooves 32 formed thereon. Therefore, the track servo error signal can be acquired by using a known push-pull method using an interference effect of a zero-order diffracted reflection light and a ±first-order diffracted reflection light. The maximum reflectance in the recording layer 1e (the sum of the zero-order diffracted reflection light and the ±first-order diffracted reflection light), which is a reference of the light intensity which is possibly detected, is typically about 60 to 95% of 1−T. Meanwhile, the maximum reflectance is adjustable by the depth of the groove 32.

When the condition of $T \geq 0.707^{1/(n-1)}$ is satisfied, 1−T=0.1091 when n=4; 1−T=0.067 when n=6; 1−T=0.0483 when n=8; 1−T=0.0378 when n=10; 1−T=0.0181 when n=20; 1−T=0.0089 when n=40; 1−T=0.0071 when n=50; 1−T=0.0035 when n=100; 1−T=0.0017 when n=200; 1−T=0.0017 when n=208; 1−T=0.0012 when n=300; and 1−T=0.0011 when n=305. The maximum reflectance is a value lower than the value of each 1−T by 5 to 40%.

When the maximum reflectance is larger than 0.001, there is an enhanced advantageous result to improve an advantageous effect of reducing the effect of stray light (noise light) (SN ratio). In view of the above, according to the layer structure, the number of recording layers may differ. When the maximum number of layers is equal to or less than 208 to 305 layers, the SN ratio can be improved while the recording layer is sufficiently secured.

Since it is required to raise the transmittance as the number of layers becomes larger in order for the recording layer to satisfy conditions of transmittance ($T \geq 0.707^{1/(n-1)}$), a preferable material for the recording material used for forming the recording layer is a substantially transparent material in which substantially no absorption occurs in the unrecorded region and the recorded region of the recording layer with regard to the wavelength λ1 of the recording light and the wavelength λ2 of the reproduction light. The substantially transparent material has an absorptivity per layer of equal to or less than 0.005, preferably between 0 and 0.001, with regard to the wavelength λ1 of the recording light and the wavelength λ2 of the reproduction light. In the following description, the definition of substantially transparent means that which follows this.

The recording material according to the first exemplary embodiment employs a material capable of performing a refractive index recording in which only a real part of the refractive index changes due to the two photon absorption caused by irradiation of recording light but an imaginary part of the refractive index does not change, namely, there is no substantial absorption loss of the recording light before and after the recording. Such a material is one in which the absorptivity at the half wavelength of the recording light and the wavelength therearound will become larger than the absorptivity at the wavelength $\lambda 1$ of the recording light. Recording by using the two photon absorption phenomenon can be performed with such a material.

The recording layer made of the above material can form the recording pit even without absorption of the recording light. Therefore, such a recording layer is especially preferable to be used in acquiring the information recording medium having equal to or more than 4 recording layers, or equal to or more than 10 recording layers. With such a recording material, the transmittance and the reflectance in each of the recording layers can be enhanced.

In the case of recording by the single photon absorption phenomenon using a conventional phase change recording material, if the number of recording layers is 1 to 3 layers, the recording pit could be formed also on the lowermost layer by reducing the film thickness of the recording layer. However, there is a limit in reducing the film thickness. In the case of equal to or more than 4 layers, since the absorption loss becomes large with the single photon absorption phenomenon, a good recording cannot be performed onto the lowermost recording layer.

Examples of the recording material include, for example, diarylethene as one of photochromic materials or derivatives thereof, and a material mixed, as required, with a substantially transparent resin by 10 to 50% by weight of the entire material. According to the photochromic material, an open-ring isomer and a closed-ring isomer may be used in a recording mode. In this case, the closed-ring isomer has a higher refractive index than that of the open-ring isomer. Therefore, when a photochromic material is used as the recording material provided that the open-ring isomer is placed in an unrecorded state and the closed-ring-isomer is placed in a recorded state, the refractive index of the recording pit will increase by recording. Accordingly, a write-once recording capable of recording once in a photon mode or a rewritable recording capable of erasing a record can be realized. As usage, it is possible for the photochromic material to be used as the recording material provided that the open-ring isomer is placed in a recorded state and the closed-ring isomer is placed in an unrecorded state. In this case, the refractive index of the recording pit lowers after recording.

With the recording material of a photon mode, a high speed recording can be achieved. Additionally, a thermostable recording can be achieved since there is no thermal effect. Consequently, it is not necessary to consider heat diffusion, and thus a recording layer and an intermediate layer can be formed into a single layer, which simplifies the layer structure to achieve a low cost.

For example, diarylethene of cis-1,2-dicyano-1,2-bis(2,4,5-trimethyl-3-thienyl)ethene (hereinafter simply referred to as the "dicyano compound") is substantially transparent when the recording wavelength $\lambda 2$=0.78 µm, and has a large absorptivity when the wavelength is half thereof, i.e., 0.39 µm, such that the two photon absorption recording can be satisfactorily done with a semiconductor laser light source. The open-ring isomer of the dicyano compound changes into a closed-ring isomer after the two photon absorption recording. At this time, the refractive index changes from 1.55 to about 1.6 at the maximum. Also, there is no absorption at the reproduction wavelength in a red to an infrared light region but only the refractive index becomes higher, which enables the light recording.

The diarylethene includes various derivatives, including 1,2-bis[2-methylbenzo[b]thiophen-3-yl]-3,3,4,4,5,5-hexafluoro-1-cyclopentene; 2,3-bis(2,4,5-trimethyl-3-thienyl)maleic anhydride; 2,3-bis(2,4,5-trimethyl-3-thienyl)maleimide; cis-1,2-dicyano-1,2-bis(2,4,5-trimethyl-3-thienyl)ethene; and the like. However, the recording material is not limited to the above-described ones but can be any material as far as it has a backbone structure of diarylethene.

Also, a mixture of diarylethene or derivatives thereof with a substantially transparent resin such as a PMMA (polymethylmethacrylate) and a UV-curable resin will adjust the refractive index or the like and facilitate a diarylethene recrystallization prevention effect and an application thereof by a spin coating method.

Figure 3:
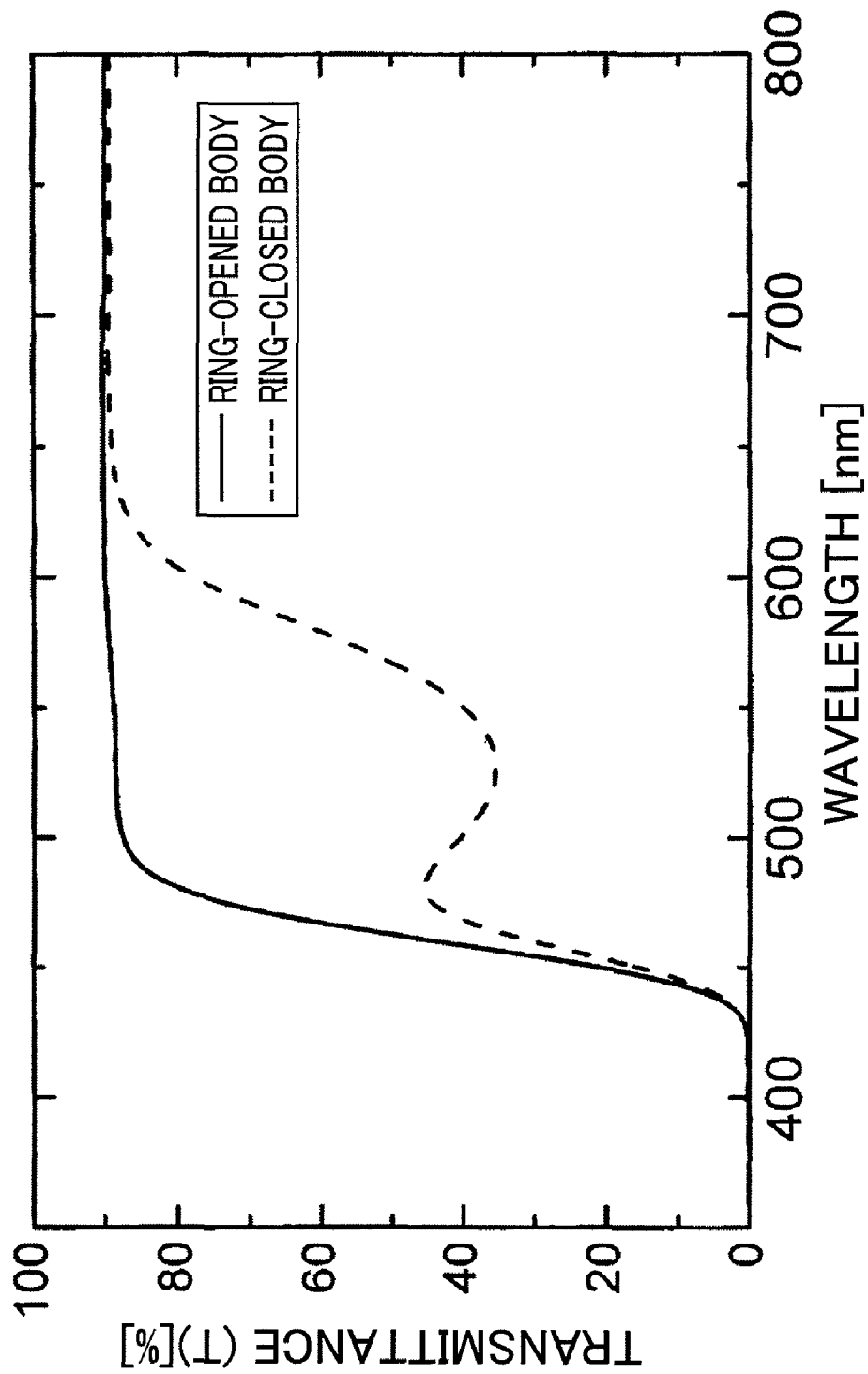
FIG. 3 is a graph showing a relationship between a transmittance and a wavelength of diarylethene as a material of the recording layer according to the first exemplary embodiment of the present invention.

FIG. 3 is a graph illustrating a relationship between the wavelength and the transmittance when a layer of the dicyano compound having a thickness of 10 µm is formed on the glass substrate. The transmittance is measured by a spectrophotometer and thus it includes about 10% of Fresnel reflection of an obverse surface and a rear surface. As shown in FIG. 3, the layer of the dicyano compound is substantially transparent both before and after opening of the dicyano compound when the recording wavelength $\lambda 1$=0.78 µm and the reproduction wavelength $\lambda 2$=0.66 µm. For example, it is apparent that a similar graph will be obtained in the case where a 0.1 µm thick recording layer includes 100 layers.

Other materials capable of being recorded in the photon mode such as a side chain liquid crystal polymer and a photopolymer can be employed in addition to the above recording materials.

The recording layer using the side chain liquid crystal polymer as the recording material has such a characteristic that the quantity of change $\Delta r$ of the refractive index of the recording pit after being recorded is relatively larger, for example, $\Delta r$=0.2. Also, since it can record a polarization direction, the recording capacity can be about doubled.

The recording layer using the photopolymer as the recording material is suitable for the write once recording since it has stable information storage after being recorded. The photopolymer includes, for example, two kinds of photopolymerization monomers, a polymerization initiator, and a sensitizing dye. For example, in the photopolymer 2 including a methacryl compound and an allyl compound as the photopolymerization monomers, benzyl as the polymerization initiator, and Micheler's ketone as the sensitizing dye, a methacryl compound having a high photopolymerization speed aggregates at the focal point of the condensing spot upon recording due to the two photon absorption to thereby raise the refractive index thereof, and, at this time, the allyl compound monomer is pushed away from a recording pit portion because it is diffused, thereby forming the recording pit.

In addition to the above, a preferable recording material includes an organic dye, a ZnS film, a $TeO_2$ film and a resin film containing superfine particles such as ZnO, and the like. Since the refractive index change of these recording materials is used, the light absorption loss preferably decreases thereby. In the present invention, the quantity of change of the refractive index may be controlled by a recording light irradiating method. Alternatively, a vacant pit, which is referred to as a void, may be recorded using pulse light having a relatively strong peak-power, i.e., between several W and several tens of kW, as the recording light. When the pit is a void, the refractive index is 1. Therefore, if the refractive index of the recording film is, for example, 1.7, the quantity of change of the refractive index becomes larger, i.e., $\Delta r=-0.7$, and therefore, the absolute value becomes larger. Therefore, signals can be reproduced in good contrast.

The intermediate layers 2 formed between the recording layers 1 are substantially transparent layers with respect to the wavelength $\lambda 1$ of the recording light and the wavelength $\lambda 2$ of the reproduction light. Examples of the material forming the intermediate layers 2 include transparent resins such as a UV-(ultraviolet light) curable resin, a visible light-curable resin, a PMMA, a norbornen resin, or a cycloolefin resin. Suitable ones will be chosen from the above according to the required refractive index, transmittance, or reflectance.

Further, examples of the material forming the substrate 9 include resins such as a polycarbonate, PMMA, a norbornen resin (for example, "ARTON" (manufactured by JSR Corporation)), or a cycloolefin resin (for example "ZEONEX" (manufactured by ZEON CORPORATION).

The protective layer 4, which is provided as required, is made of a material substantially transparent to the wavelength $\lambda 1$ of the recording light 7A and the wavelength $\lambda 2$ of the reproduction light 7B. More specifically, for example, use of a material identical to that of the intermediate layers 2 will simplify the manufacturing process; however, a transparent material other than that of the intermediate layers 2 may be used.

Now, a relationship between the transmitted light and the reflected light of the information recording medium 21, and change of the refractive index before and after the recording according to the first exemplary embodiment will be described below.

FIG. 4 is a pattern diagram illustrating an enlarged recording unit 3 of the information recording medium 21 according to the first exemplary embodiment. In FIG. 4, the recording layers 1a-1e are provided with a plurality of rows of track grooves 32. Since the track grooves 32 are formed, tracks 42 are formed. The tracks 42 are recording regions. An unrecorded region 11 within each of the tracks 42 shows a state that no recording pit 5 is formed therein, whereas a recorded region 10 shows a state that the recording pit 5 is formed therein.

For example, in the case of a recording layer 1b, if reproduction light 28b having a peak-power smaller than that of the recording light is incident into the unrecorded region 11, there are generated reflected light 25b and transmitted light 26b. Also, if an incident light 28a having a peak-power smaller than that of the recording light is incident into the recorded region 10, there are generated reflected light 25a and transmitted light 26a.

In the wavelength $\lambda 1$ of the recording light, if the difference (for example, 0.1) between the refractive index of the unrecorded region 11 of the recording layers 1 (for example, 1.55) and the refractive index of the intermediate layers 2 (for example, 1.65) is larger than the difference (for example, 0.05) between the refractive index of the recorded region 10 of the recording layers 1 (for example, 1.60) and the refractive index of the intermediate layers 2 (for example, 1.65), the reflectance of the unrecorded region 11 becomes larger while the reflectance of the recorded region 10 becomes smaller. Consequently, provided that the transmittance per layer at the unrecorded region 11 of each of the recording layers 1 is T1 and the transmittance per layer at the recorded region 10 of each of the recording layers 1 is T2, the relation T2>T1 is established.

The average transmittance of the recording layers 1 when all of the tracks 42 are unrecorded will be represented by T=T1. On the other hand, in typical tracks 42 each having a half width of a track pitch, if the tracks are recorded by a DC-free PWM modulation, the average of the transmittance of the recording layers 1 when all the tracks 42 are recorded will come close to T=(3T1+T2)/4. Meanwhile, the diffraction loss per layer due to the recording pit 5 can be ignored since the diffraction loss will be equal to or less than 0.001. Accordingly, the transmittance becomes higher after recording.

In view of the above, in the case where the transmittance in the unrecorded region 11 of which transmittance is low satisfies the relation $T1 \geq 0.707^{1/(n-1)}$, even if all the tracks 42 of the recording layers 1a-1d upper than the target layer 1e are unrecorded, the light intensity can be secured at the lowermost recording layer 1e equal to or more than about 0.7 fold (0.707 fold). In this case, if the recording is performed three-dimensionally (write once recording) from the uppermost layer 1a nearest to the objective lens 6 toward the lowermost layer 1e, the light intensity will be preferably prevented from being attenuated since the transmittance of the recording layers 1 will be improved by the recording.

On the other hand, at the wavelength $\lambda 1$ of the recording light, the difference (for example, 0.05) between the refractive index of the unrecorded region 11 of the recording layers 1 (for example, 1.55) and the refractive index of the intermediate layers 2 (for example, 1.50) is smaller than the difference (for example, 0.10) between the refractive index of the recorded region 10 of the recording layers 1 (for example, 1.60) and the refractive index of the intermediate layers 2 (for example, 1.50), the reflectance of the unrecorded region 11 becomes smaller while the reflectance of the recorded region 10 becomes larger. Therefore, provided that the transmittance per layer at the unrecorded region 11 of the recording layers 1 is T1 and the transmittance per layer at the recorded region 10 of the recording layers 1 is T2, the relation T2<T1 will be established.

The average transmittance of the recording layers 1 when all the tracks 42 are unrecorded is represented by T=T1. On the other hand, the average transmittance of the recording layers 1 when all the tracks 42 are recorded comes close to T=(3T1+T2)/4. Consequently, the transmittance becomes lower after recording.

In view of the above, when the transmittance after recording satisfies the relation $(3T1+T2)/4 \geq 0.707^{1/(n-1)}$, even if all the tracks 42 of the recording layers 1a-1d which are positioned upper than the target layer 1e are recorded, the light intensity can be secured by equal to or more than about 0.7 fold (0.707 fold) at the lowermost recording layer 1e. In this case, preferably, the recording (write once recording) is three-dimensionally performed from the lowermost layer 1e farthest from the objective lens 6 toward the upper layer 1a in the point that the decreasing of transmittance due to the recording can be prevented at the recording layers 1a-1d upper than the target layer 1e.

Now, the transmittance upon reproduction will be described below. For example, if the reproduction light 7B is incident into the recording pit 5 to detect the reflected light 8B therefrom in FIG. 1B, the reproduction light 7B will be subjected to an optical loss due to the reflection and absorption at the recording layers 1 not only in an approach route but also in a return route when the reproduction light transmits the recording layers 1. It is preferable for the unrecorded region 11 and the recorded region 10 of the recording layers 1 to be substantially transparent to the wavelength of the reproduction light. Use of such recording material can improve the transmittance and the reflectance at each of the recording layers.

When the track grooves 32 are formed on the recording layers 1, the track servo error signal can be acquired by the known push-pull method using the interference effect of the zero-order diffracted reflection light and the ±first-order diffracted reflection light upon reproduction. In other words, about 60 to 95% of the value 1−T can be obtained at each of the recording layers as the maximum reflectance of the target recording layer upon reproduction.

When the reflected light intensity obtained in the case where the target layer is the lowermost layer 1e is equal to or more than 0.5 fold as much as the reflected light intensity as a reference value obtained in the case where the target layer is the uppermost layer 1a, it was found that practical reproduction signals can be obtained with less power adjustment of the reproduction light source (about several percent to 50 percent), or no power adjustment thereof. Therefore, at the wavelength of the reproduction light, if the transmittance TR per layer of the recording layers 1 is set to be $TR \geq 0.707^{1/(n-1)}$ with regard to the n number of the recording layers 1, the reflected light intensity obtained by the target layer when it is the lowermost layer 1e can be equal to or more than 0.5 fold as much as that obtained in the case of the uppermost layer 1a.

Further, at the wavelength $\lambda 2$ of the reproduction light, if the difference (for example, 0.10) between the refractive index of the unrecorded region 11 of the recording layers 1 (for example, 1.55) and the refractive index of the intermediate layers 2 (for example, 1.65) is larger than the difference (for example, 0.05) between the refractive index of the recorded region 10 of the recording layers 1 (for example, 1.60) and the refractive index of the intermediate layers 2 (for example, 1.65), the transmittance of the recording layers 1 when all the tracks 42 are unrecorded is represented by TR=TR1, and the average transmittance of the recording layers 1 when all the tracks are recorded becomes TR=(3TR1+TR2)/4 since the diffraction loss per layer due to the recording pit 5 is almost ignorable because of being equal to or less than 0.001, where the transmittance per layer at the unrecorded region 11 of the recording layers 1 is TR1 and the transmittance per layer at the recorded region 10 of the recording layers 1 is TR2 (>TR1). Here, the width of each track 42 is half of the track pitch and recording is performed by the DC-free PWM modulation. As such, the transmittance TR will improve after recording, such that if the relation $TR1 \geq 0.707^{1/(n-1)}$ can be satisfied, more than half of the reflected light intensity from the lowermost layer 1e can be preferably secured even in the case where all the tracks 42 of the recording layers 1a-1d positioned upper than the target layer 1e are unrecorded.

Further, at the wavelength $\lambda 2$ of the reproduction light, if the difference (for example, 0.05) between the refractive index of the unrecorded region 11 of the recording layers 1 (for example, 1.55) and the refractive index of the intermediate layers 2 (for example, 1.50) is smaller than the difference (for example, 0.10) between the refractive index of the recorded region 10 of the recording layers 1 (for example, 1.60) and the refractive index of the intermediate layers 2 (for example, 1.50), the transmittance of the recording layers 1 when all the tracks 42 are unrecorded is represented by TR=TR1, where the transmittance per layer in the unrecorded region 11 of the recording layers 1 is TR1 and the transmittance per layer in the recorded region 10 of the recording layers 1 is TR2 (<TR1). On the other hand, in a typical track 42 having a half width of the track pitch, the transmittance of the recording layers 1 when all the tracks 42 are recorded comes close, on average, to TR=(3TR1+TR2)/4 when recording is performed by the DC-free PWM modulation. The diffraction loss per layer due to the recording pit 5 can be almost ignored since it is only less than 0.1%. Therefore, since the transmittance TR lowers after recording, it is preferable that, if the relation $(3TR1+TR2)/4 \geq 0.707^{1/(n-1)}$ is satisfied, more than half of the reflected light intensity from the lowermost layer 1e can be secured even if all the tracks 42 of the recording layers 1a-1d which are positioned upper than the target layer 1e are recorded.

The reproduction light source has less peak-power in comparison with that of the recording light source (for example, between about 1 mW and 10 mW) and thus has a space for the maximum output amount. Therefore, if the reflected light intensity at the predetermined recording layer becomes less than 0.5 fold, the reflected light intensity can be adjusted by raising the power of the light source. For example, if the output intensity of the reproduction light source is raised when becoming closer to the lowermost recording layer 1, a sufficient amount of reflected light intensity 8B can be secured.

In the first exemplary embodiment, the thickness L of the recording layers 1 is set so as to satisfy the relation $0.63\lambda 2/(4r2) \leq L \leq 1.37\lambda 2/(4r2)$ with regard to the wavelength $\lambda 1$ of the recording light, the wavelength $\lambda 2$ of the reproduction light, the refractive index r1 of the unrecorded region, and the refractive index r2 of the recorded region. Since the relation $0.63\lambda 2/(4r2) \leq L \leq 1.37\lambda 2/(4r2)$ is satisfied, a reflectance equal to or more than 70% of the maximum reflectance of the reproduction light can be obtained. If reflectance equal to or more than 70% of the maximum reflectance is secured, it has been confirmed that suitable reproduction signals can be obtained without changing the configuration of an IC of a detection circuit having been conventionally used in the optical information recording/reproducing device. Also, when $L=\lambda 2/(4r2)$, the maximum reflectance of the recording layers 1 can be obtained at the wavelength $\lambda 2$ of the reproduction light and thus, the SN ratio of the reproduction signal becomes suitable to enable good reproduction. Further, if the thickness L of the recording layers 1 is set so as to satisfy the relation $0.63\lambda 1/(4r2) \leq L \leq 1.37\lambda 1/(4r2)$, a reflectance equal to or more than 70% of the maximum reflectance of the recording light can be obtained at the wavelength $\lambda 1$ of the recording light. Therefore, the SN ratio of the servo error signal upon recording becomes suitable. However, since the intensity of the recording light 7A is sufficiently larger than the intensity of the reproduction light 7B, it is preferable for the thickness L of the recording layers 1 to satisfy the relation $0.63\lambda 2/(4r2) \leq L \leq 1.37 k2/(4r2)$.

Provided that $\lambda 1=0.78$ μm and $\lambda 2=0.66$ μm, if r1=1.55, r2=1.60, and the refractive index of the intermediate layers 2 is 1.65 (>r2), it is more preferable that $0.065$ μm$\leq L \leq 0.14$ μm and L=0.10 μm. Here, T1=0.9964 and T2=0.9991 at the wavelength $\lambda 1$ of the recording light, the transmittance when all the tracks 42 are unrecorded becomes T=T1=0.9964, and the transmittance when all the tracks 42 are recorded becomes on average T=(3T1+T2)/4=0.9971. Therefore, even if all the tracks 42 are unrecorded, the number of the recording layers 1 can satisfactorily satisfy n=97, and n=120 can be established when all the tracks 42 are recorded. The refractive index of the recording layers 1 are decided for a certain degree according to the material; however, there are large number of materials to be used for the intermediate layers 2. As a result thereof, the refractive index of the intermediate layers can be freely selected, such that it is possible to increase the transmittance when recorded and increase the total number of layers n (for example, about 100 layers) by having the refractive index of the intermediate layers come close to the refractive index r2 of the recorded region 10 at the wavelength $\lambda 2$ of the reproduction light.

Here, TR1=0.9961 and TR2=0.9991 at the wavelength λ2 of the reproduction light, and the transmittance when all the tracks 42 are unrecorded becomes TR=TR 1=0.9961, whereas the transmittance when all the tracks 42 are recorded becomes on average TR=(3TR1+TR2)/4=0.9969. Also, the refractive index of the intermediate layers is brought closer to the refractive index r2 of the recorded region 10 (preferably, a difference therebetween of within 0.1) at the wavelength λ2 of the reproduction light, and thereby the transmittance TR2 can be increased to increase the intensity of the detection signals. Further, the refractive index r2 of the recorded region 10 and the refractive index of the intermediate layers are set to a value substantially identical to each other at the wavelength λ2 of the reproduction light, and thereby TR2=1 will be established to enable the modulation depth (contrast) of the reproduction signal to be up to almost 100%.

Where λ1=0.78 μm and λ2=0.66 μm, if, for example, r1=1.55 and r2=1.60 and if the refractive index of the intermediate layers 2 is 1.50 (<r1), it is preferable that 0.065 μm≦L≦0.14 μm and L=0.10 μm. Here, T1=0.9990 and T2=0.9961 at the wavelength λ1 of the recording light, and the transmittance when all the tracks 42 are unrecorded is T=T1=0.9990, whereas the transmittance when all the tracks 42 are recorded is on average T=(3T1+T2)/4=0.9983. Therefore, the number of recording layers 1 can be n=347 when all the tracks 42 are unrecorded, whereas the number of recording layers can be n=204 when all the tracks 42 are recorded. When the refractive index of the intermediate layers is brought closer to the refractive index r1 of the unrecorded region at the wavelength λ1 of the recording light, the transmittance of the unrecorded region increases TR and then, the number of layers n can be increased (for example, about several hundreds of layers). Here, if the refractive index of the intermediate layers is set to be a value identical to the refractive index r1 of the unrecorded region, since no reflection signal can be obtained in the unrecorded state, it is preferable that the difference between the refractive index of the intermediate layers and the refractive index r1 of the unrecorded region is between about 0.04 and 0.1.

Here, TR1=0.9989 and TR2=0.9958 are established at the wavelength λ2 of the reproduction light, and the transmittance when all the tracks 42 are unrecorded is TR=TR1=09989, whereas the transmittance when all the tracks 42 are recorded is on average TR=(3TR1+TR2)/4=0.9981. Also, when the refractive index of the intermediate layers is brought closer to the refractive index r1 of the unrecorded region 10 at the wavelength λ2 of the reproduction light, the transmittance TR1 when unrecorded increases and thus, the detection signal intensity can be increased. Here, if the refractive index of the intermediate layers is set to a value identical to the refractive index r1 of the unrecorded region 10, since no reflection signal can be obtained when unrecorded, it is preferable that the difference between the refractive index of the intermediate layers and the refractive index r1 of the unrecorded region 10 is between about 0.04 and 0.1.

Figure 5A:
FIG. 5 illustrates a manufacturing process of the information recording medium according to the first exemplary embodiment of the present invention.
Figure 5B:
Figure 5C:
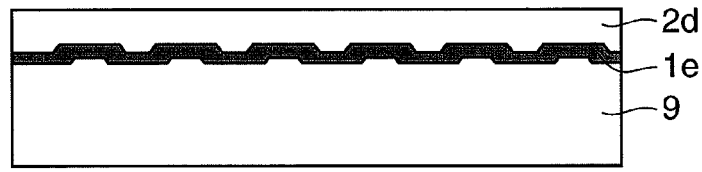
Figure 5D:
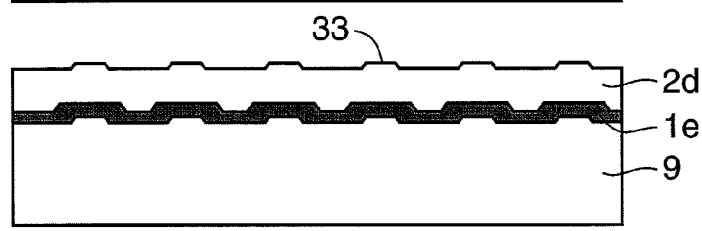
Figure 5E:
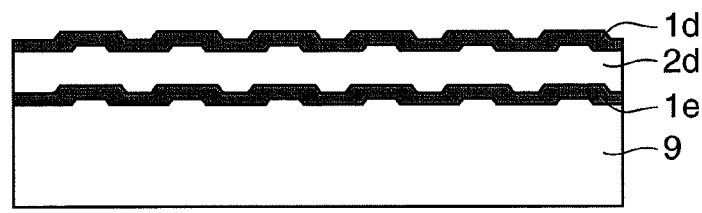
Figure 5F:
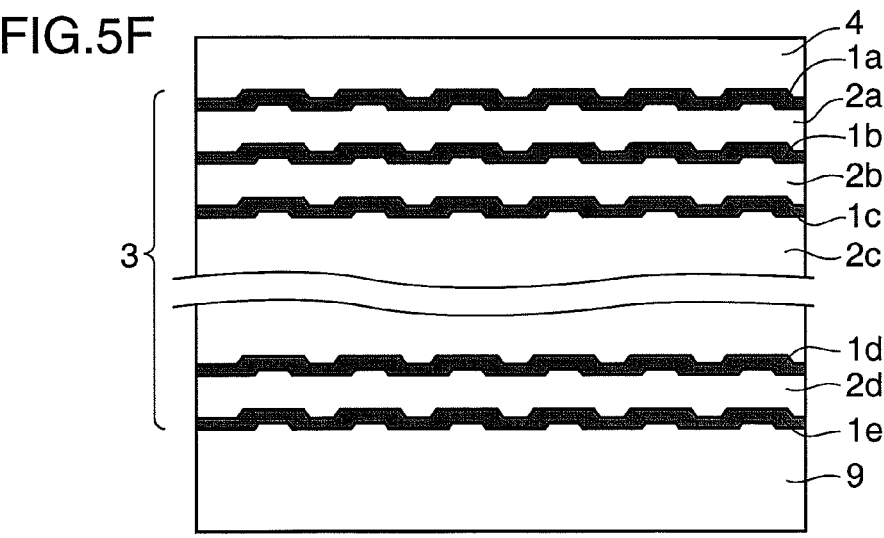

Now, a method for manufacturing an information recording medium 21 according to the first exemplary embodiment will be described below. A conventionally known method can be applied as the method for manufacturing an information recording medium 21 of the first exemplary embodiment. In other words, as shown in FIG. 5, the substrate 9 on which the track grooves 32 are formed by an injection molding process is provided with the recording layer 1e formed thereon by using, for example, a spin coating method (FIG. 5B). Further, the intermediate layer 2d is formed thereon in a similar manner by using the spin coating method (FIG. 5C). Further, the track grooves 33 are formed on the intermediate layer 2d by using a transfer means such as a stamper (FIG. 5D). Still further, the intermediate layer 2d on which the track grooves 33 are formed is provided in a similar manner as described above with the recording layer 1d, the intermediate layer 2c, the track grooves, the recording layer 1c, the intermediate layer 2b, . . . formed thereon repeatedly. As described above, the recording unit 3 including the plurality of recording layers and the plurality of intermediate layers is formed. Finally, the protective layer 4 is provided on the recording unit 3 formed thereon by, for example, an application method or a film formation method (FIG. 5F). Each of the recording layers and each of the intermediate layers are formed by using an application method such as the spin coating method, such that the information recording medium can be manufactured with ease, thereby realizing low cost manufacturing.

In the first exemplary embodiment, the intermediate layers 2 and the recording layers 1 may be formed in surplus. And, the excessive layers (namely, portions of the recording unit onto which light is incident) may be used as the protective layer 4. With the configuration of the recording unit, no formation of the protective layer 4 according to an independent step is required, and the protective layer made of the material substantially identical to that of the recording unit 3 will be formed.

If each of the recording layers 1 has substantially the same film thickness, the conditions of the application step becomes equivalent for every recording layer, which facilitates the manufacturing process. Further, if each of the intermediate layers 2 has substantially the same film thickness, the manufacturing process will be facilitated. Still further, it is preferable that each of the recording layers 1 and each of the intermediate layers 2 are formed into a single layer structure since the manufacturing process is facilitated.

Figure 6:
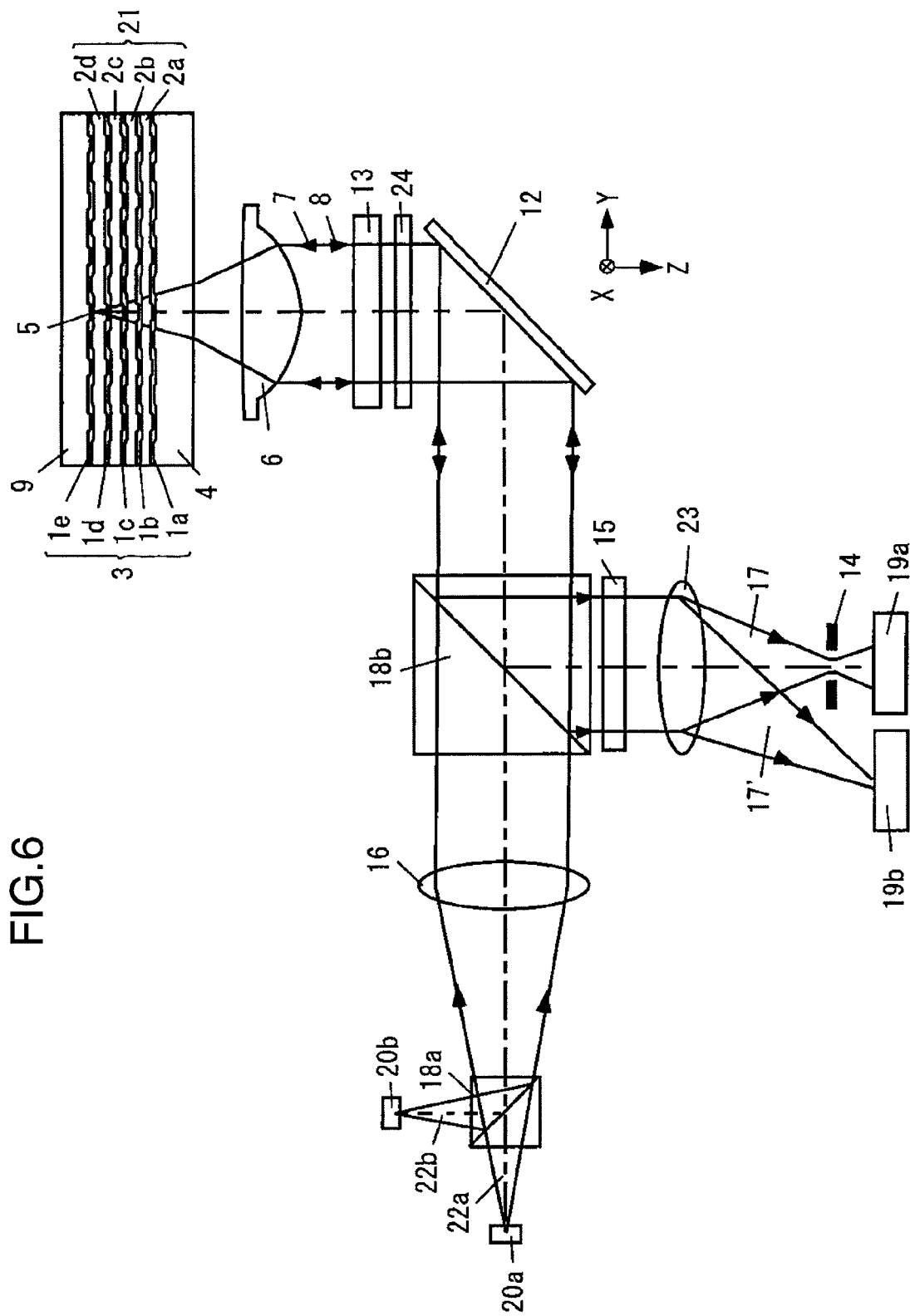
FIG. 6 illustrates a configuration of an optical information recording/reproducing device and how to record or reproduce a signal of the information recording medium thereby in the first exemplary embodiment of the present invention.

Now, an optical information recording/reproducing device for recording/reproducing the recording pit of the information recording medium according to the first exemplary embodiment will be described below. As shown in FIG. 6, the optical information recording/reproducing device 40 according to the first exemplary embodiment has two types of light sources having different wavelengths such as the recording light source 20a and the reproducing light source 20b. Light paths from the light sources 20a, 20b to the information recording medium 21 are provided with a beam splitter 18a, a collimator lens 16, a beam splitter 18b, a mirror 12, a wave plate 24, a spherical aberration correcting element 13, and an objective lens 6.

A light path, i.e., a return path, from the beam splitter 18b to a light detector 19 is provided with a focus/track error signal detection optical element 15, a detection lens 23, and a pin hole 14 for minimizing crosstalk between the layers of the information recording medium 21.

The recording light source 20a is a recording semiconductor pulse laser light source having a wavelength of k2=0.78 μm and, upon recording, changes the pulse width in accordance with the length of the recording mark including the recording pit, for example, between 1 nanosecond and 100 nanoseconds, to irradiate it. For example, it is preferable to elongate the pulse width in accordance with the recording mark. The reproduction light source 20b is a reproduction semiconductor laser light source having a wavelength of, for example, 0.66 μm. With the semiconductor laser light source, cost performance is lowered. In the two photon absorption recording, since the pulse light source is utilized, a recording light having a larger peak-power can be irradiated with ease to provide advantageous sensitivity. Also, in such recording, the recording pit size can be minimized compared to a normal single photon absorption recording owing to the nonlinear phenomenon thereof, such that the recording capacity of the information recording medium 21 is determined by the wavelength of the reproduction light. In the two photon absorption recording, the spot diameter miniaturized to 0.7 fold. Therefore, the wavelength of the reproduction light source 20b is set to be shorter than the wavelength of the recording light source 20a in order to achieve a higher intensity. In the two photon absorption recording, it is desirable that the wavelength of the reproduction light source 20b is about 0.7 fold as much as the wavelength of the recording light source 20a.

In the case of the semiconductor laser light source, it is possible to have it irradiate the pulse light having a large peak-power as the recording light source 20a, and to have it irradiate continuum having a small peak-power as the reproduction light source 20b, so as to allow the recording light source 20a to serve as the reproduction light source 20b. In such a case, a simple configuration can be realized because of the reduced number of component parts such as the beam splitter 18a; however, it is preferable to have a separate light source in view of facilitating a high intensity.

As shown in FIG. 6, a wave plate 24 is provided in a common light path of the recording/reproducing light up to the objective lens 6 and the light source 20. The wave plate 24 is designed substantially into a λ/4 plate or a similar plate thereof with regard to the recording light 22a while it is substantially designed into a λ/2 plate, a λ plate, or a similar plate thereof with regard to the reproduction light 22b by using a difference of their wavelengths. Also, the beam splitter 18a is designed so as to transmit the recording light 22a whereas reflects the reproduction light 22b by using a difference of their wavelengths, and further the beam splitter 18b is designed, which serves as a polarization beam splitter with regard to the recording light 22a and serves as a half mirror which less depends on a polarization direction with regard to the reproduction light 22b.

In the optical information recording/reproducing device 40 according to the first exemplary embodiment, as shown in FIG. 6, the recording light 22a of the pulse laser light, which is a linearly polarized light irradiated in a Y axis direction from the recording light source 20a and having a relatively large peak-power, initially passes through the beam splitter 18a upon recording. Then, the recording light 22a becomes a substantially collimated light through a collimator lens 16 to transmit the beam splitter 18b as a beam dividing element, and the light path of the recording light 22a is bent in a −Z axis direction by the mirror 12. Subsequently, the recording light 22a bent in the −Z axis direction (laser light 7) is substantially converted into circularly polarized light at the wave plate 24 to pass through the spherical aberration correcting element 13, resulting in passing through the spherical aberration correcting element 13 to further pass the protective layer 4 of the information recording medium 21 having the above-described configuration through the objective lens 6 having, for example, a numerical aperture of NA=0.85 and a focal length of 2 mm in order to condense the recording light onto a desired recording layer 1e of the recording unit 3. A row of the recording pit 5 is recorded onto the recording layer 1e using the two photon absorption process while performing the focus servo and the track servo using the reflected light 8. The transmittance per layer of the recording layers 1 with regard to the wavelength of the recording light is set to a value equal to or more than $0.707^{1/(n-1)}$ with regard to the number of the recording layers n (n is an integer equal to or larger than 4) to thereby prevent the recording power from being decreased at also the lowermost layer of the recording layers 1 (recording layer 1e in FIG. 4) and therefore almost no power adjustment is required. As a result thereof, the recording light 22a having almost a constant wavelength without a wavelength shift can be irradiated and therefore, recording onto each of the recording layers 1 can be performed in a good condition while applying the focus servo thereon.

At the wavelength of the recording light, if the difference between the refractive index of the unrecorded region of the recording layers 1 and the refractive index of the intermediate layers 2 is larger than the difference between the refractive index of the recorded region of the recording layers 1 and the refractive index of the intermediate layers 2, the recording pits are three-dimensionally recorded in series onto the recording layers from the recording layer 1a nearest to the objective lens 6, whereas if the difference between the refractive index of the unrecorded region of the recording layers 1 and the refractive index of the intermediate layers 2 is smaller than the difference between the refractive index of the recorded region of the recording layers 1 and the refractive index of the intermediate layers 2, the recording pits are three-dimensionally recorded onto the recording layers in series from the recording layer 1e farthest from the objective lens 6, thereby improving the transmittance at the recording layers 1 in a preferable manner.

At this time, the thickness of the recording unit 3 through which the convergent light from the objective lens 6 passes varies depending on the recording depth. If recording is performed while the spherical aberration amount is controlled by the spherical aberration correcting element 13 provided in the light path between the light source 20 and the objective lens 6 in accordance with the recording depth of the information pit 5 to be recorded in the recording unit 3, a suitable recording pit 5 can be formed precisely. The spherical aberration correcting element 13 includes a liquid crystal element in which distribution of the refractive index is variable, a beam expander including a combination of a concave lens and a convex lens in which the distance between the concave lens and the convex lens can be varied in a light axis direction by an actuator, or a movable collimator lens which can vary the distance between the light source 20 and the collimator lens 16 by an actuator or the like, and the like.

Upon reproduction, the reproduction light 22b which is the lineally polarized laser light irradiated from the reproduction light source 20b is bent in the Y axis direction by the beam splitter 18a, and also becomes substantially collimated light through the collimator lens 16 to pass through the beam splitter 18b, and thereby the light path of the reproduction light 22b is bent in the −Z axis direction by the mirror 12. Then, the reproduction light 22b having been bent in the −Z axis direction (laser light 7) passes through the wave plate 24 and the spherical aberration correcting element 13 to be condensed onto the recording pit 5 of the desired recording layer 1e of the recording unit 3 of the information recording medium 21 by the objective lens 6 while it is lineally polarized.

At the wavelength of the reproduction light, the transmittance TR per layer of the recording layers 1 satisfies the relation $TR \geq 0.707^{1/(n-1)}$ with regard to the number of layers n of the recording layers 1 (n is an integer equal to or larger than 4), such that the intensity of the reflected light obtained when the target layer is the lowermost layer 1e is equal to more than 0.5 fold as much as that of the uppermost layer 1a. Therefore, with not much power adjustment of the reproduction light source 20b (between about several percent and about 50%) or with no adjustment, practical reproduction signals can be obtained.

The laser light 8 reflected by the recording pit 5 returns to a reverse direction to pass through the objective lens 6, the spherical aberration correcting element 13, the wave plate 24, and the mirror 12 in this order, and the light axis of the laser light is bent in the Z axis direction by the beam splitter 18b to be divided into a plurality of lights by a diffractive focus/track error signal detection optical element 15 to finally become detection convergent lights 17, 17' through the detection lens 23. The detection convergent light 17 as the reproduction signal light passes through the pin hole 14 and thereby signals are detected by the light detector 19a. The divided detection convergent light 17' as a focus/track error signal light does not pass through the pin hole and is detected by the other light detector 19b. Since the detection convergent light 17' as the focus/track error signal light does not passes through the pin hole, the focus error signal is detected by an astigmatic focus error detection method and a SSD method (spot size detection method) and the track error signal is detected by a three beam tracking method and a phase-differential method. In other words, the recording pit is recorded/reproduced by using a change of the optical constant of the recording layer while the focus servo and the track servo are performed by using the reflected light 8.

The focal length of the detection lens 23 is, for example, 33 mm, and the diameter of an airy disk at a side of the light detector 19 is, for example, 9.6 Mm. The pin hole 14 is defined at a substantial focus position of the detected convergent light 17. With the pin hole 14, the recording pits 5 resides on the upper and the lower recording layers 1a-1d in a light axis direction other than the desired recording layer 1e, crosstalk light (crosstalk between layers) light as unnecessary reflected light caused by irradiation of the convergent light of the objective lens 6 is distributed outside the pin hole 14. Since the light does not come into the pin hole 14, the crosstalk between the layers decreases. Also, instead of the pin hole 14, a small light detector 19a having a reception unit of a light detector of an identical diameter as the pin hole, which detects the detection convergent light 17, can produce a similar effect.

In the first exemplary embodiment, if the diameter of the pin hole 14 is equal to or less than 5 folds as much as that of the airy disk of the detection convergent light 17 of the reproduction signal light, the quality of the reproduction signal is improved up to a level, for example, no problem occurs when each distance between the recording layers 1 is Δd=5 to 8 μm (the amount of crosstalk between layers is ≦30 dB). While, if the diameter of the pin hole 14 is made smaller, it is possible to make the distance between the recording layers 1 (thickness of the intermediate layers 2) smaller. However, if the diameter of the pin hole 14 is made too small, the amount of light coming into the pin hole 14 decreases or an optical system may be deflected according to the ambient temperature to cause a tendency that the detection convergent light 17 deviates from the center of the pin hole 14. As the number of layers n becomes larger, the detected amount of light decreases. Therefore, the signal intensity can be improved by using an APD (avalanche photodiode).

Second Exemplary Embodiment

Figure 7:
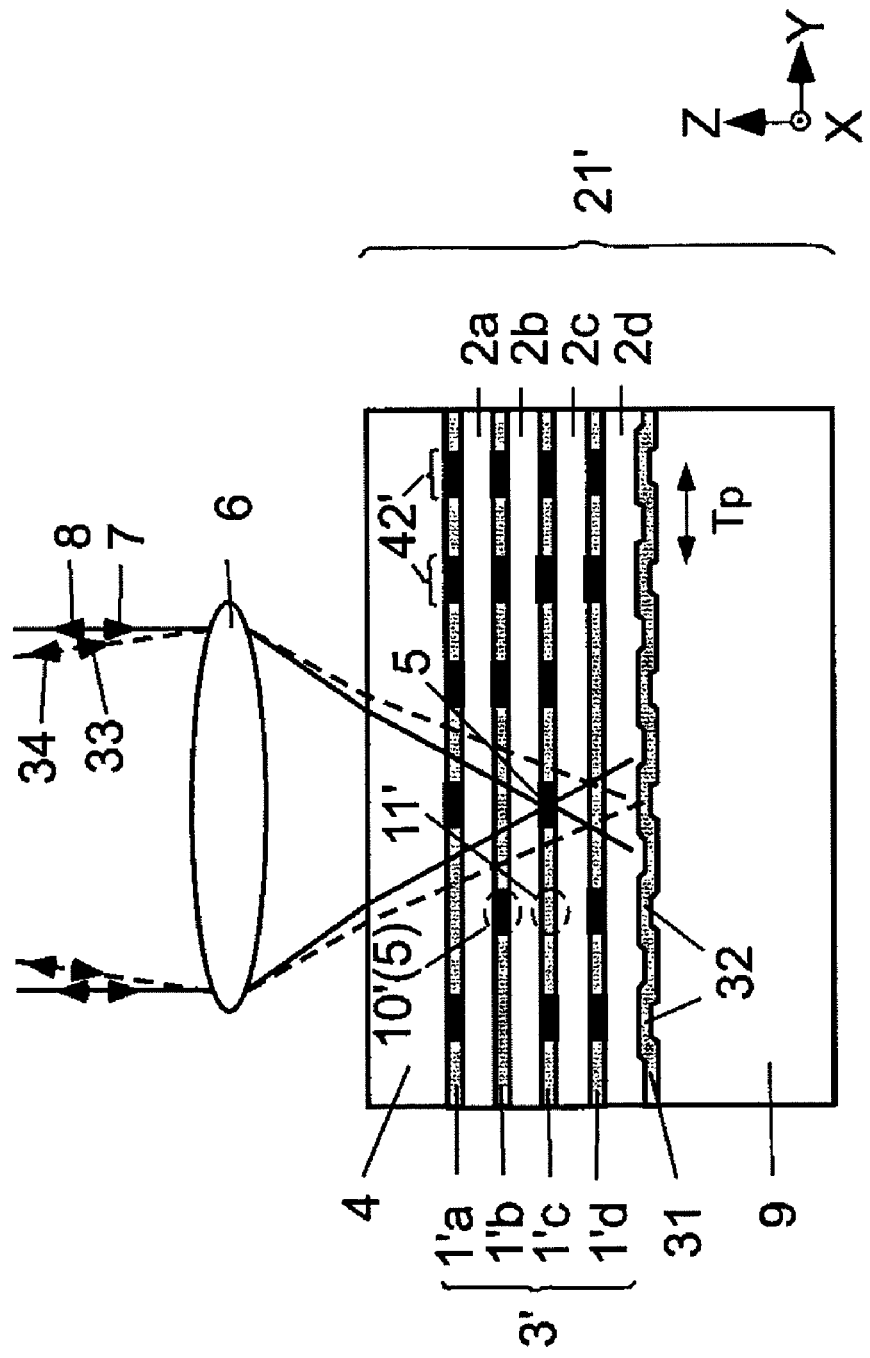
FIG. 7 illustrates a configuration of the information recording medium and how to reproduce a signal of the information recording medium thereby according to a second exemplary embodiment of the present invention.
Figure 8:
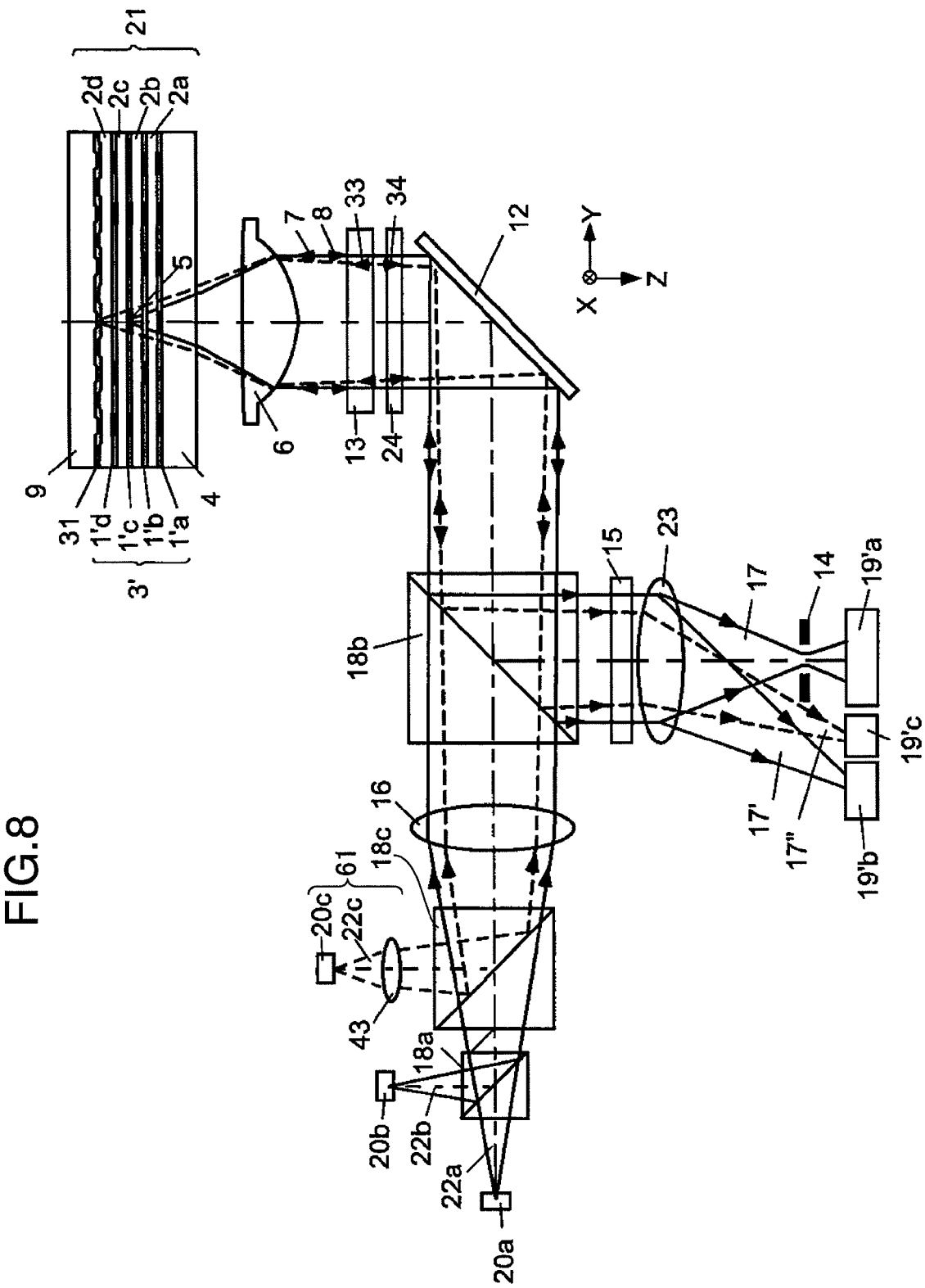
FIG. 8 illustrates a configuration of an optical information recording/reproducing device and how to record or reproduce a signal of the information recording medium thereby in the second exemplary embodiment of the present invention.

Now, an information recording medium and a method for manufacturing the same, an optical information recording/reproducing device according to a second exemplary embodiment will be described below with reference to FIGS. 7 to 11, focusing on points different to the first exemplary embodiment. FIG. 7 illustrates a configuration of an information recording medium according to the second exemplary embodiment and how to reproduce a signal thereby, FIG. 8 illustrates a configuration of an optical information recording/reproducing device and how to record/reproduce a signal of the information recording medium thereby, FIG. 9 illustrates a bonding step of the recording unit with the substrate in a manufacturing process of the information recording medium according to the second exemplary embodiment of the present invention, FIG. 10 illustrates an application step and a drying step in a manufacturing process of the information recording medium according to the second exemplary embodiment; and FIG. 11 is a diagram illustrating an application step and a drying step of the other manufacturing process of the information recording medium according to the second exemplary embodiment of the present invention.

As shown in FIG. 7, an information recording medium 21' according to the second exemplary embodiment differs from the information recording medium 21 according to the first exemplary embodiment in that each of recording layers 1' (four layers 1'a-1'd are illustrated in FIG. 7) is flat and includes no track groove 32. Also, the substrate 9 and a recording unit 3' includes the track guide layer 31 having the track groove 32 formed therebetween. The recording light 7 is incident onto a track 42' as a recording region of a targeted recording layer 1'c to form the recording pit 5 on an unrecorded region 11'.

The reflected light 8 returned from the track 42' of the recording layer 1'c is an zero-order diffraction reflected light since each of recording layer 1' does not have a track groove. Therefore, since high diffracted light, i.e., more than +first-order diffracted light, which may be generated by irradiating the recording light onto the track groove will not occur, optical loss due to stray light will decrease. Accordingly, the transmission light intensity and the transmittance, and the reflected light intensity and the reflectance can be increased. Since the stray light decreases, the SN ratio of the reflected light 8 as a reflection signal can be improved.

At the wavelength λ1 of the recording light or the wavelength λ2 of the reproduction light, if the recording layers 1' are substantially transparent, the maximum reflectance at the recording layer 1'c is typically 1−T, except for an amount of diffraction loss which occurs at the recording pit 5, provided that the transmittance of the recording layer 1' is T. Meanwhile, the amount of the diffraction loss will be approximately several percent with respect to the reflectance. In the information recording medium 21 according to the first exemplary embodiment, the maximum reflectance was a value 0.6 to 0.95 fold as much as the value of 1−T. Since the reflected light 8 from the track 42' of the flat recording layers 1' with no track groove is detected by a light detector (not shown), the focus servo error signal having a suitable SN ratio and a reproduction signal in the case of the reproduction light can be obtained concurrently.

Also, in the information recording medium 21' according to the second exemplary embodiment, since the transmittance T per layer of the recording layers 1' satisfies $T \geq 0.707^{1/(n-1)}$ at the wavelength λ1 of the recording light, suitable recording can be performed with a non-linear recording such as the two photon absorption without necessitating much power adjustment of the recording light source or without any power adjustment thereof while applying the focus servo to any of the recording layers 1'. Meanwhile, the power can be controlled to thereby be enhanced by about 30% at the maximum.

In the information recording medium 21', each of the recording layers does not include a track groove, such that the track servo is performed by irradiating the track guide illumination light onto the track groove of the track guide layer 31. The track guide illumination light 33 is condensed onto the track groove 32 of the track guide layer 31 through the objective lens 6. Since the track guide reflected light 34 as the diffracted reflection light is detected by a light detector (not shown), a track servo error signal of the reproduction light or the recording light 7 can be obtained. The reproduction light or the recording light 7 may be shifted by an actuator or the like to an optimum position (on the track) in a track pitch direction (+Y direction) by using the track servo error signal, while synchronizing with the track guide illumination light 33.

An optical information recording/reproducing device 60 according to the second exemplary embodiment further includes, as shown in FIG. 8, in addition to constituent elements similar to those of the first exemplary embodiment, a track guide illumination light generation means 61 including a combination of a track guide illumination light source 20c and a track guide illumination condenser lens 43.

In FIG. 8, the condensing state of the track guide illumination light 33 (22C) coming out of the track guide illumination light source 20c is adjusted through the track guide illumination condenser lens 43 to thereafter pass through the beam splitter 18c. Then, the track guide illumination light 33 becomes substantially collimated light through the collimator lens 16 to pass through the beam splitter 18b, resulting in that the optical path of the track guide illumination light is bent in the −Z axis direction by the mirror 12. The track guide illumination light 33 having been bent in the −Z axis direction passes through the wave plate 24 and the spherical aberration correcting element 13 to be condensed onto the track guide layer 31 through the objective lens 6 having, for example, a numerical aperture of NA=0.85 and a focal length of 2 mm. The track guide reflected light 34 as the diffracted reflection light at the track guide layer 31 turns in a reverse direction to pass through the objective lens 6, the spherical aberration correcting element 13, the wave plate 24, and the mirror 12 in this order, resulting in that the light axis of the track guide reflected light 34 is bent in the Z axis direction by the beam splitter 18b. The track error signal light 17" as the track error signal having been bent in the Z axis direction is detected by a track error signal light detector 19'c. The light detector 19'a and the reproduction signal light detector 19'b serve to detect a focus error signal. Since the track error signal light 17" does not pass through the pin hole, the track error signal can be detected by a known method such as a three beam tracking method, a phase-differential method, or the like. The recording pit is recorded/reproduced by means of the recording light or the reproduction light while the track servo is performed by using the track error signal light 17'.

The optical information recording/reproducing device 60 shown in FIG. 8 is provided with a condensing lens 43 for adjusting the track guide illumination light source 20c and a light condensing state of the track guide outgoing beam 22c irradiated from the track guide illumination light source 20c. With regard to the track guide illumination light source 20c and the condensing lens 43, the light source 20c is arranged nearer than a focal position of the condensing lens 43 such that, for example, the track guide illumination light incident onto the objective lens 6 becomes a diverging ray, so as to allow the track guide illumination light 33 to be condensed onto the track guide layer 31.

As a generation means of the track guide illumination light, in addition to the above-described means including the track guide illumination light source 20c, a dedicated condensing lens may be provided near each of the light sources by using the recording light source 20a upon reproduction and by using the reproduction light source 20b upon recording, such that the incident light 33 toward the objective lens 6 can be the diverging ray.

Now, a method for manufacturing an information recording medium 21' according to the second exemplary embodiment will be described below with reference to FIG. 9. Each of the recording layers 1' of the information recording medium 21' has no track groove. Therefore, a transfer process for forming the track groove on every recording layer, as described in the method for manufacturing an information recording medium according to the first exemplary embodiment, is not necessary. As a result thereof, the manufacturing process is simplified.

Figure 9A:
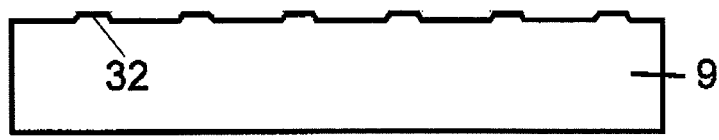
FIG. 9 illustrates a manufacturing process of the information recording medium according to the second exemplary embodiment of the present invention.
Figure 9B:
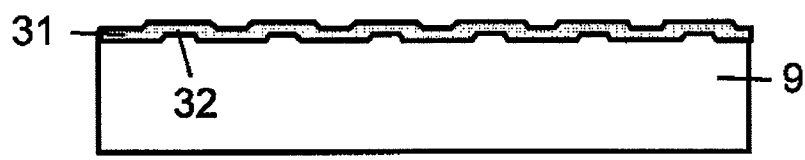

Initially, the substrate 9 with the track groove 32 is formed by means of injection molding (FIG. 9A). Then, a surface of the track groove 32 is provided with a track guide layer formed into a thin film which is made of a material having an optical property different from a material forming the substrate 9, more specifically, having an optical property such as a refractive index and an absorptivity. Any thin film can be used as far as it has an optical property different from that forming the material of the substrate. Specific examples thereof include an inorganic dielectric thin film such as $TeO_2$ and ZnS, and an organic thin film. The track guide layer 31 is formed with such a thin film (FIG. 9B). Meanwhile, the thin film may be formed by any method and the thin film such as a dielectric substance may be formed by a sputtering method, a CVD method such as a plasma CVD, a vacuum deposition or the like or an application method.

On the other hand, a surface of a separately prepared film 29 which is substantially transparent to the recording wavelength λ1 and the reproduction wavelength λ2 is provided with a recording unit 3' formed thereon.

A film having a thickness between 50 and 100 μm made of polycarbonate, polymethyl methacrylate (PMMA), a norbornen resin, or a cycloolefin resin is preferable as the film 29. The above films are also used as the protective layer 4 of the optical information recording medium 21'.

Figure 9C:
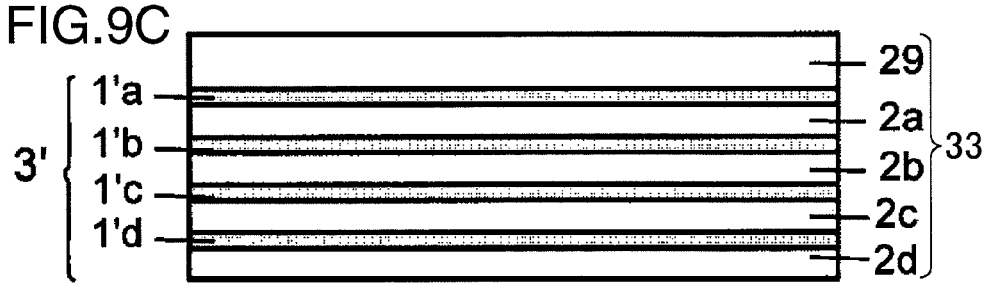

A recording layer 1'a is formed on the film 29 by a spin coat method and the intermediate layer 2a is further formed thereon. Similarly, formation of a recording layer 1'b, the intermediate layer 2b, . . . , is repeated. Accordingly, a film 33 with recording unit including a recording unit 3' having a plurality of recording layers and a plurality of intermediate layers is formed (FIG. 9C).

Figure 9D:
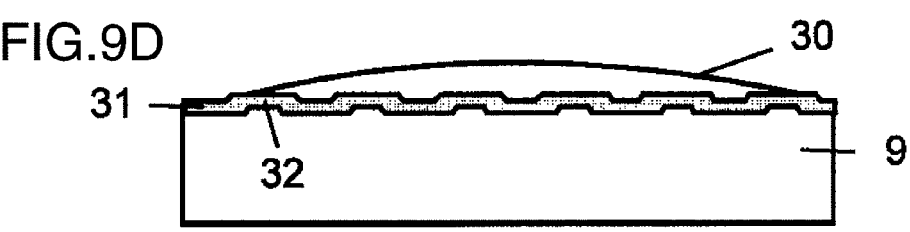
Figure 9E:
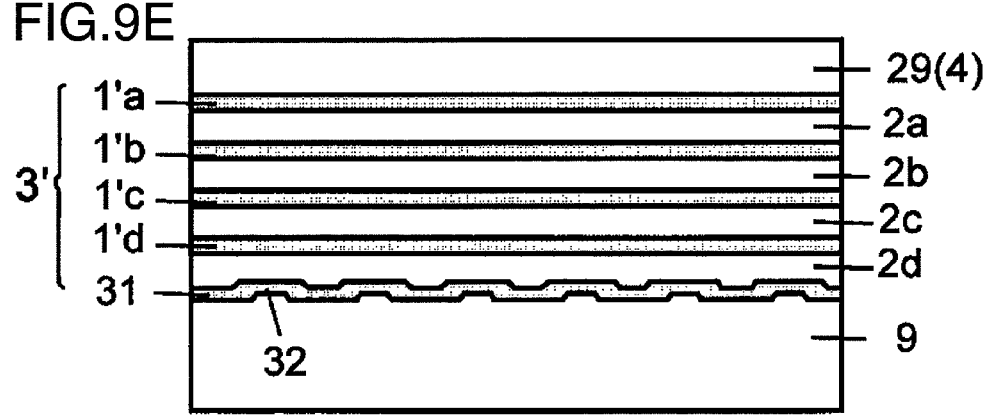
Figure 13:
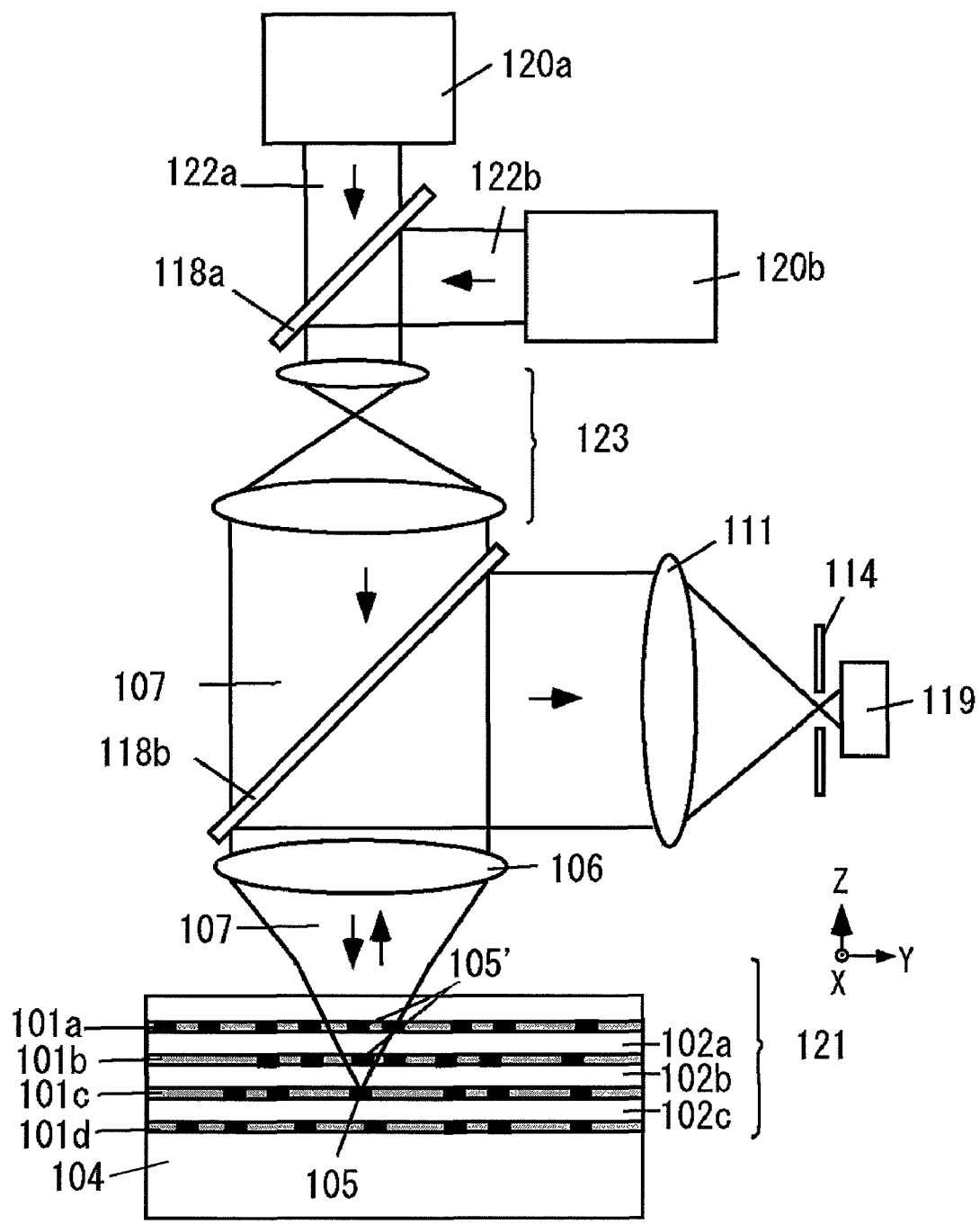
FIG. 13 illustrates a configuration of a conventional optical information recording/reproducing device and how to record or reproduce a signal of the information recording medium thereby.

Subsequently, the track guide layer 31 formed on the substrate 9 and the recording unit 3' are bonded with the adhesive 30 such that they are facing each other (FIGS. 9D and 9E). Examples of the adhesive 30 include a UV-curable resin and a heat-hardening resin which are substantially transparent to the track guide illumination light. The spin coat method is preferably used when applying the adhesive 30. A preferable application amount of the adhesive 30 is about such a degree that nonuniformity of the track groove 32 can be made flat owing to the thickness of an adhesive layer formed by the cured adhesive 30. With such an adhesive layer, the nonuniformity of the track groove 32 can be prevented from being transferred to the recording unit 3'. If the nonuniformity is transferred to the recording unit 3', unnecessary diffracted light may occur upon irradiation of the recording light or the reproduction light, resulting in a possible undesirable lowering of the SN ratio.

The film with recording unit 33 is formed into a larger size than an outer shape of the substrate 9, and after the film with recording unit 33 and the substrate 9 are bonded to each other, the film with recording unit 33 is cut in conformity with the outer shape of the substrate 9, thereby obtaining an information recording medium 21', which is a preferable method for the reasons described below.

When the information recording medium having a plurality of recording layers is formed such that layers are laminated one on another on the substrate by the spin coat method, the resin applied thereon may form a bump along a peripheral border of the substrate 9 to thereby make the peripheral border of the information recording medium 21' thicker. Such nonuniformity of thickness inside a surface of the information recording medium 21' will invite lowering of recording/reproducing performance. According to the above-described method, since the thicker peripheral border can be cut off, nonuniformity of the thickness inside the surface of the information recording medium 21' becomes less, and thereby the recording/reproducing performance is improved. Also, depending on the size of the film with recording unit 33, a plurality of the recording units 3' of the information recording medium 21' can be manufactured at once, such that a manufacturing cost can be decreased.

According to the method as described below, the film with recording unit 33 having a larger area can be manufactured efficiently in series.

FIG. 10 illustrates an example of a configuration of an apparatus 80 for manufacturing the film with recording unit 33 having a larger area in series. In FIG. 10, the symbol 35c denotes a recording layer formation material line, 36c denotes an intermediate layer formation material line, 37a denotes a first recording layer formation nozzle, 37b denotes a second recording layer formation nozzle, 38a denotes a first intermediate layer formation nozzle, 38b denotes a second intermediate layer formation nozzle, 39a and 39b denote film conveyance rollers, 41 denotes a hot air duct, and 40a-40d denote hot air nozzles. Also, 29 denotes a film.

The film 29 is conveyed by the film conveyance rollers 39a, 39b in a direction from right to left in FIG. 10. Here, the film 29 is conveyed substantially with no surface waving. The film 29 is continuously provided with a recording layer formation material 35 applied thereon by a spray coating method or the like using the first recording layer formation nozzle 37a. The applied recording layer formation material 35 is subjected to hot air from the hot air nozzle 40a to thereby cure the resin component in order to form a first recording layer 1'a. The first recording layer 1'a is continuously provided with the intermediate layer formation material 36 applied thereon by the first intermediate layer formation nozzle 38a. The applied intermediate layer formation material 36 is subjected to hot air from the hot air nozzle 40b to thereby remove the solvent component in order to form the first intermediate layer 2'a. The recording layer formation material 35 and the intermediate layer formation material 36 are prepared to have a predetermined density when they are in the form of an organic solvent solution or an emulsion. According to a similar method, a second recording layer 2'a and a second intermediate layer 2'b are further formed thereon. In FIG. 10, the case in which two sets of the recording layers and the intermediate layers are exemplified; however, the number of layers can be increased by increasing the number of the recording layer formation nozzles, the intermediate layer formation nozzles, and the hot air nozzles. Meanwhile, the thickness of each of the recording layers and the thickness of each of the intermediate layers can be readily adjusted by adjusting the application amount of the recording layer formation material 35 and the intermediate layer formation material 36 by changing the sizes of the nozzles, or by changing the density of the materials. In other words, if one wishes to change the thickness of the recording layer to 0.1 µm and the thickness of the intermediate layer to 5 µm with, for example, the materials having the same viscosity and the same density, the film thickness can be multiplied by about 50 by setting the cross sectional area of the intermediate layer formation nozzle to about 50 fold as much as the cross sectional area of the recording layer formation nozzle.

If a solvent-free type UV-curable resin is used as a material of or is mixed with the material of the recording layer or the intermediate layer, a UV light irradiation apparatus may be used instead of the hot air nozzles 40a-40d. The recording layer and the intermediate layer can be formed by having them cured with irradiation of the UV light by the UV light irradiation apparatus.

FIG. 11 illustrates a diagram of a manufacturing apparatus capable of manufacturing the film with recording unit 33 having a larger area further efficiently in series.

In FIG. 11, 35c denotes the recording layer formation material line, 36c denotes the intermediate layer formation material line, 37a denotes the first recording layer formation nozzle, 38a denotes the first intermediate layer formation nozzle, 37b denotes the second recording layer formation nozzle, 38b denotes the second intermediate layer formation nozzle, 39a and 39b denote the film conveyance rollers, and 40a denotes the hot air nozzle. Also, 29 denotes the film.

The film 29 is conveyed from right to left in FIG. 11 by means of the film conveyance rollers 39a, 39b. The film 29 is provided with the recording layer formation material 35 applied continuously thereon by a spray coating method or the like using the first recording layer formation nozzle 37a. Then, the applied recording layer formation material 35 is provided with the intermediate layer formation material 36 applied continuously thereon by the first intermediate layer formation nozzle 38a. Subsequently, the applied intermediate layer formation material 36 is provided with the recording layer formation material 35 by the second recording layer formation nozzle 37b and further provided with the intermediate layer formation material 36 by the second intermediate layer formation nozzle 38b applied continuously thereon in a similar manner.

A multilayer including the recording layer formation material 35 and the intermediate layer formation material 36 in which the recording layer formation resin layers and the intermediate layer formation resin layers are applied twice on the film 29 is subjected to hot air from the hot air nozzle 40a in order to remove the solvent composition, resulting in forming the intermediate layers and the recording layers. With the above-stated manufacturing apparatus, a plurality of sets of the recording layers and the intermediate layers can be formed at the same time. Since a plurality of sets of layers can be formed at once, the manufacturing process thereof can be further simplified. In the above application step, if the recording layer formation material 35 and the intermediate layer formation material 36 interfuse with each other, a critical surface separating layer may be provided between a layer of the recording layer formation material 35 and a layer of the intermediate layer formation material 36. An applicable transparent resin such as a PMMA or a PVA is used as the above critical surface separating layer.

Third Exemplary Embodiment

Now, an information recording medium according to a third exemplary embodiment of the present invention will be described below focusing on the differences to the information recording medium according to the first and the second exemplary embodiments.

The information recording medium according to the third exemplary embodiment differs from the information recording medium according to the first and the second exemplary embodiments in that the recording material forming the recording layer has a slight absorptivity at the wavelength of the recording light and/or the wavelength of the reproduction light.

Now, an information recording medium having a configuration identical to that of the information recording medium according to the second exemplary embodiment shown in FIG. 7 except for a characteristic of the recording material will be described below with reference to FIG. 12. The information recording medium including a track groove formed on each of the recording layers as shown in FIG. 1 is applicable in a similar manner. A detailed explanation of the information recording medium as shown in FIG. 1 will be omitted in order to avoid redundancy of the explanation.

At the wave length λ1 of the recording light, if the difference (for example, 0.1) between the refractive index of the unrecorded region 11" of the recording layers 1 (for example 1.55) and the refractive index of the intermediate layers 2 (for example 1.65) is larger than the difference (for example, 0.05) between the refractive index of the recorded region 10" of the recording layers 1 (for example, 1.60) and the refractive index of the intermediate layers 2 (for example, 1.65), the information recording medium 21" according to the third exemplary embodiment is characterized in that it satisfies $T1 \geq 0.707^{1/(n-1)}$ and further satisfies $A1 < A2 \leq 1 - T2$, where the transmittance per layer in the unrecorded region 11" of the recording layers 1 is T1, the transmittance per layer in the recorded region 10" of the recording layers 1 is T2, the absorptivity per layer in the unrecorded region 11' of the recording layers 1 is A1, and the absorptivity per layer in the recorded region 10" of the recording layers 1 is A2. As described in the description of the first exemplary embodiment, when $T1 \geq 0.707^{1/(n-1)}$ is satisfied, even if all the tracks 42" of the recording layers (1"a-1"c) which are the upper layers of the lowermost layer (1"d) are unrecorded, the light intensity of the lowermost recording layer 1"d can be also secured to a degree of equal to or more than about 0.7 fold (0.707 fold) as much as the light intensity at the recording layer 1"a of the uppermost layer.

When $A1 < A2 \leq 1 - T2$ is satisfied, the absorptivity at the recording wavelength of the recording material will become higher if the recording layers 1" are recorded. Since the absorptivity of the recording light becomes higher as the recording process advances, the temperature of the recording layer becomes higher. And, the recording sensitivity increases in accordance with the temperature rise. Like the information recording medium according to the third exemplary embodiment, when recording is performed by using the recording layer made of a photon mode material such as a diarylethene by means of the two photon absorption phenomenon, the quantum yield improves when the temperature of the recording layers rises, and thus the recording sensitivity increases.

Further, since the absorptivity A2 per layer in the recorded region 10" is larger than the absorptivity A1 per layer in the unrecorded region 11", the transmittance T2 of the recorded region 10 will be lowered. Then, the transmittance T2 comes close to the transmittance T1 of the unrecorded region 11" to minimize the difference between T1 and T2. In this case, there is substantially no difference in the transmittances between the recorded region 10 and the unrecorded region 11", such that the SN ratio improves to obtain an information recording medium excellent in a read-out property. Here, the unrecorded region 11" is substantially transparent and thus it is preferable that the absorptivity A1 per layer in the unrecorded region 11" is equal to or less than 0.001. In view of the definitions of the absorptivity and the transmittance, $A2 + T2 \leq 1$, namely, $A2 \leq 1 - T2$, is established. Depending on the peak-power of the recording light, if the peak-power is about 1 W, and the absorptivity A2 exceeds 0.5% (0.005) or up to several percent, the single photon absorption tends to occur in addition to the two photon absorption, such that it is preferable that the maximum value of the absorptivity A2 is between 0.5% and several percent.

Further, at the wavelength λ1 of the recording light 7, if the information recording medium has a difference (for example, 0.02) between the refractive index of the recorded region 10" of the recording layers 1" (for example, 1.60) and the refractive index of the intermediate layers 2 (for example, 1.62) equal to or less than 0.05, and if a difference between the absorptivity A2 per layer in the recorded region 10" of the recording layers and 1−T2 is equal to or less than 0.002, the difference between T1 and T2 becomes very small. Also, in this case, there is no substantial difference in the transmittance between the recorded region 10 and the unrecorded region 11, with almost no effect from the recording pit. As a result thereof, the SN ratio improves and therefore a preferable information recording medium excellent in the read-out property can be obtained.

On the other hand, at the wavelength λ1 of the recording light, if the difference (for example, 0.05) between the refractive index of the unrecorded region 11 of the recording layers 1 (for example, 1.55) and the refractive index of the intermediate layers 2 (for example, 1.50) is smaller than the difference (for example, 0.10) between the refractive index of the recorded region 10 of the recording layers 1 (for example, 1.60) and the refractive index of the intermediate layers 2 (for example, 1.50), it is characterized that the relations $(3T1+T2)/4 \geq 0.707^{1/(n-1)}$ and $A2 < A1 \leq 1 - T1$ are satisfied, provided that the transmittance per layer in the unrecorded region 11" of the recording layers 1" is T1, the transmittance per layer in the recorded region 10' of the recording layers 1 is T2, the absorptivity per layer in the unrecorded region 11" of the recording layers 1" is A1, and the absorptivity per layer in the recorded region 10" of the recording layers 1" is A2.

When $A2 < A1 \leq 1 - T1$ is satisfied, if the recording layers 1" are recorded, the transmittance becomes higher since the absorptivity at the recording wavelength of the recording material lowers. Then, the transmittance T2 of the recorded region comes close to the transmittance T1 to minimize the difference between T1 and T2. Here, since there is substantially no difference in the transmittance between the recorded region 10 and the unrecorded region 11, the SN ratio improves. Therefore, an information recording medium excellent in the read-out property can be obtained. Here, it is preferable that the recorded region 10" is substantially transparent and the absorptivity A2 per layer in the recorded region 10" is equal to or less than 0.001. In view of the definitions of the absorptivity and the transmittance, $A1 + T1 \leq 1$, namely, $A1 \leq 1 - T1$, is established.

At the wavelength λ2 of the reproduction light 7, if the difference (for example 0.10) between the refractive index of the unrecorded region 11" of the recording layers 1 (for example, 1.55) and the refractive index of the intermediate layers 2 (for example, 1.65) is larger than the difference (for example 0.05) between the refractive index of the recorded region 10" of the recording layers 1, (for example, 1.60) and the refractive index of the intermediate layers 2 (for example, 1.65), it is characterized that the relation $TR1 \geq 0.707^{1/(n-1)}$ is satisfied and also $A3 < A4 \leq 1 - TR2$ is satisfied, provided that the transmittance per layer in the unrecorded region 11" of the recording layers 1" is TR1, the transmittance per layer in the recorded region 10" of the recording layers 1" is TR2, the absorptivity per layer in the unrecorded region 11" of the recording layers 1" is A3, and the absorptivity per layer in the recorded region 10 of the recording layers 1" is A4. As has been described in the first exemplary embodiment, if $TR1 \geq 0.707^{1/(n-1)}$ is satisfied, even if all the tracks 42" of the recording layers (1"a-1"c) which are positioned upper than the lower most layer ($1''d$) are unrecorded in the lowermost layer ($1''d$), the intensity of the reflected light of the lowermost recording layer $1d$ equal to or more than about 0.5 fold as much as the intensity of the reflected light in the uppermost recording layer $1a$ can be secured.

If $A3<A4\leq1-TR2$ is satisfied, since the absorptivity A4 of the reproduction light 7 of the recorded region 10 is larger than the absorptivity A3 of the reproduction light 7 of the unrecorded region 11, the transmittance TR2 of the recorded region 10 lowers. Accordingly, the transmittance TR2 comes close to the transmittance TR1 of the unrecorded region 11'' to minimize the difference between TR1 and TR2. Here, since there is no substantial difference in the transmittance between the recorded region 10 and the unrecorded region 11, the SN ratio improves to obtain a preferable information recording medium excellent in the read-out property. In view of the definitions of the absorptivity and the transmittance, $A4+TR2\leq1$, namely, $A4\leq1-TR2$, is established. It is preferable that the unrecorded region 11 is substantially transparent and further preferable that the absorptivity A3 is equal to or less than 0.001, which tends to cause the two photon absorption. Also, if the absorptivity A4 per layer in the recorded region 10 exceeds 0.005, the single photon absorption by the reproduction light tends to occur and thus the reproduction light tends to deteriorate. Therefore, it is preferable that the absorptivity A4 is equal to or less than 0.005.

Further, in the information recording medium, at the wavelength $\lambda2$ of the reproduction light 7, if the difference (for example, 0.02) between the refractive index of the recorded region 10, of the recording layers $1''$ (for example, 1.60) and the refractive index of the intermediate layers 2 (for example, 1.62) is equal to or smaller than 0.05, and the difference between the absorptivity A4 per layer in the recorded region 10 of the recording layers $1''$ and $1-TR2$ is equal to or less than 0.2%, the difference between TR1 and TR2 becomes very small. Here, since the difference between the transmittance TR2 of the reproduction light in the recorded region $10''$ and the transmittance TR1 of the reproduction light in the unrecorded region $11''$ is small, there is no substantial difference in the transmittance between the recorded region $10''$ and the unrecorded region $11''$, resulting in almost no effect from the recording pit. As a result thereof, the SN ratio improves to obtain a preferable information recording medium excellent in the read-out property.

Also, at the wavelength $\lambda2$ of the reproduction light, if the difference (for example, 0.05) between the refractive index of the unrecorded region $11'$ of the recording layers $1''$ (for example, 1.55) and the refractive index of the intermediate layers 2 (for example, 1.50) is smaller than the difference (for example, 0.10) between the refractive index of the recorded region $10''$ of the recording layers $1''$ (for example, 1.60) and the refractive index of the intermediate layers 2 (for example, 1.50), it is characterized that $(3TR1+TR2)/4\geq0.707^{1/(n-1)}$ is satisfied and $A4<A3\leq1-TR1$ is satisfied between A3 and A4, provided that the transmittance per layer in the unrecorded region $11''$ of the recording layers $1''$ is TR1, the transmittance per layer in the recorded region $10''$ of the recorded layers $1''$ is TR2, the absorptivity per layer in the unrecorded region $11'$ of the recording layers $1''$ is A3, and the absorptivity per layer in the recorded region $10''$ of the recording layers $1''$ is A4.

If $A4<A3\leq1-TR1$ is satisfied, the absorptivity A3 of the reproduction light 7 of the unrecorded region $11''$ is larger than the absorptivity A4 of the reproduction light 7 of the recorded region $10''$, such that the absorptivity at the reproduction wavelength $\lambda2$ of the recording material lowers upon recording to the recording layers $1''$. The transmittance TR2 of the recorded region $10''$ comes close to the transmittance TR1 of the unrecorded region $11''$, and thereby the difference between TR1 and TR2 becomes smaller. Here, since the difference in the transmittance between the recorded region $10''$ and the unrecorded region 11 is small, there is no substantial difference in the transmittance between the recorded region $10''$ and the unrecorded region $11''$. As a result thereof, the SN ratio improves and a preferable information recording medium excellent in the read-out property can be obtained. In view of the definitions of the absorptivity and the transmittance, $A3+TR1\leq1$, namely, $A3\leq1-TR1$, is established. Here, it is desirable to be substantially transparent at the recorded region $10''$, and it is desirable that A3 is equal to or less than 0.001.

A method for manufacturing an information recording medium and a configuration of the optical information recording/reproducing device of the third exemplary embodiment are identical to those of the first and the second exemplary embodiments.

The information recording media and the method for manufacturing the same, and the optical information recording/reproducing devices and the methods according to the first, the second, and the third exemplary embodiments have been described above. The present invention, however, is not limited to those exemplary embodiments. An information recording medium and a method for manufacturing the same, and an optical information recording/reproducing device by combination of the information recording medium and the method for manufacturing the same, and the optical information recording/reproducing device according to each of the exemplary embodiments is also encompassed within the present invention, which can produce the same effect. The above information recording medium includes a rewritable type information recording medium in addition to the write once type information recording medium.

The objective lens, the collimator lens, the detection lens, and the condensing lens used in the above exemplary embodiments are named for descriptive purpose, and they are identical to general lenses.

In the above-described exemplary embodiments, optical disks are exemplified as the information recording medium; however, the present invention also encompasses applications to similar information record reproduction devices such as card-type, drum-type, or tape-type products designed to reproduction media having a plurality of different specifications in thickness, recording density, and the like.

INDUSTRIAL APPLICABILITY

The information recording medium of the present invention relates to an information recording medium including a recording pit capable of being three-dimensionally recorded. More specifically, the present invention can provide an information recording medium, of which the amount of recording light decreases less with regard to the lower recording layers away from the object lens, capable of performing a suitable recording by using the two photon absorption while the focus servo is applied to every recording layer.

The invention claimed is:

1. An information recording medium having a substrate, and a recording unit capable of recording three-dimensionally a recording pits onto the substrate:

wherein the recording unit includes n number of recording layers, where n is an integer equal to or larger than 4, on which information is recorded by using a two photon absorption phenomenon, and a plurality of intermediate layers laminated one on another with each of the recording layers;

wherein the recording layer includes a recording material capable of recording at a photon mode;

wherein the plurality of intermediate layers are substantially transparent at a wavelength λ1 of the recording light and at a wavelength λ2 of the reproduction light, respectively;

wherein a light intensity of recording light incident onto a recording layer nearest to the substrate is more than 0.707 fold as much as a light intensity of recording light incident onto a recording layer farthest from the substrate;

wherein an absorptivity A1 per layer of an unrecorded region of the recording layers and an absorptivity A2 per layer of a recorded region of the recording layers are different from each other at the wavelength λ1 of the recording light;

wherein a difference between a refractive index of the unrecorded region of the recording layers and a refractive index of the intermediate layers is larger than a difference between a reflective index of the recorded region of the recording layers and a refractive index of the intermediate layers at the wavelength λ1 of the recording light;

wherein a transmittance T1 per layer of the unrecorded region at the wavelength λ1 of the recording light satisfies conditions of the following relation:

$$T1 \geq 0.707^{1/(n-1)}$$

where n is an integer equal to or larger than 4, which represents the number of recording layers; and wherein the absorptivity A1 and the absorptivity A2 satisfy conditions of the following relation:

$$A1 < A2 \leq 1-T2$$

provided that T2 is a transmittance per layer of the recorded region at the wavelength λ1 of the recording light.

2. The information recording medium according to claim 1, wherein the recording material of the photon mode is one selected from the group consisting of diarylethene, derivatives of diarylethene, and a photopolymer.

3. An information recording medium having a substrate, and a recording unit capable of recording three-dimensionally a recording pits onto the substrate:

wherein the recording unit includes n number of recording layers, where n is an integer equal to or larger than 4, on which information is recorded by using a two photon absorption phenomenon and a plurality of intermediate layers laminated one on another with each of the recording layers;

wherein the recording layer includes a recording material capable of recording at a photon mode;

wherein the plurality of intermediate layers are substantially transparent at a wavelength λ1 of the recording light and at a wavelength λ2 of the reproduction light, respectively;

wherein a light intensity of recording light incident onto a recording layer nearest to the substrate is more than 0.707 fold as much as a light intensity of recording light incident onto a recording layer farthest from the substrate;

wherein an absorptivity A1 per layer of an unrecorded region of the recording layers and an absorptivity A2 per layer of a recorded region of the recording layers are different from each other at the wavelength λ1 of the recording light; and wherein a thickness L of the recording layers satisfies conditions of the following relation with regard to a refractive index r2 of the recorded region of the recording layers:

$$0.63\lambda 2/(4r2) \leq L \leq 1.37\lambda 2/(4r2).$$

4. The information recording medium according to 1, wherein an absorptivity A3 per layer of the unrecorded region and an absorptivity A4 per layer of the recorded region at the wavelength λ2 of the reproduction light satisfy conditions of the following relation:

$$A3 < A4 \leq 1-TR2$$

provided that the TR2 is a transmittance per layer of the recorded region at the wavelength λ2 of the reproduction light.

5. The information recording medium according to claim 1, wherein an absorptivity Al per layer of the unrecorded region is equal to or less than 0.001.

6. The information recording medium according to claim 4, wherein an absorptivity A3 per layer of the unrecorded region is equal to or less than 0.001.

7. The information recording medium according to claim 1, a difference between a refractive index of the recorded region and a refractive index of the intermediate layers is equal to or less than 0.05, and a difference $|A2 -(1-T2)|$ between the absorptivity A2 and 1−T2 is equal to or less than 0.002.

8. An information recording medium having a substrate, and a recording unit capable of recording three-dimensionally a recording pits onto the substrate:

wherein the recording unit includes n number of recording layers, where n is an integer equal to or larger than 4, on which information is recorded by using a two photon absorption phenomenon, and a plurality of intermediate layers laminated one on another with each of the recording layers;

wherein the recording layer includes a recording material capable of recording at a photon mode;

wherein the plurality of intermediate layers are substantially transparent at a wavelength λ1 of the recording light and at a wavelength λ2 of the reproduction light, respectively;

wherein a light intensity of recording light incident onto a recording layer nearest to the substrate is more than 0.707 fold as much as a light intensity of recording light incident onto a recording layer farthest from the substrate;

wherein an absorptivity A1 per layer of an unrecorded region of the recording layers and an absorptivity A2 per layer of a recorded region of the recording layers are different from each other at the wavelength λ1 of the recording light; and wherein a difference between a refractive index r 1 of the unrecorded region of the recording layers and a refractive index of the intermediate layers is smaller than a difference between a reflective index r2 of the recorded region of the recording layers and a refractive index of the intermediate layers at the wavelength λ1 of the recording light;

wherein a transmittance T1 per layer of the unrecorded region and a transmittance T2 per layer of the recorded region at the wavelength λ1 of the recording light satisfy conditions of the following relation:

$$(3T1+T2)/4 \geq 0.707^{1/(n-1)}$$

(where n is an integer equal to or larger than 4, which represents the number of recording layers; and wherein an absorptivity A1 per layer of the unrecorded region and an absorptivity A2 per layer of the recorded region at the wavelength λ1 of the recording light satisfy conditions of the following relation:

$$A2 < A1 \leq 1 - T1$$

(provided that T1 is a transmittance per layer of the unrecorded region at the wavelength λ1 of the recording light).

9. The information recording medium according to claim 8, wherein an absorptivity A3 per layer of the unrecorded region and an absorptivity A4 per layer of the recorded region at the wavelength λ2 of the reproduction light satisfy conditions the following relation:

$$A4 < A3 \leq 1 - TR1$$

where TR1 is a transmittance per layer of the unrecorded region at the wavelength λ2 of the reproduction light.

10. The information recording medium according to claim 8, wherein an absorptivity A2 per layer of the recorded region is equal to or less than 0.001.

11. The information recording medium according to claim 9, wherein an absorptivity A4 per layer of the recorded region is equal to or less than 0.001, respectively.

12. A method for manufacturing an information recording medium comprising:
   a film with recording unit forming step of forming a recording unit such that recording layers and intermediate layers are laminated one on another on a surface of a predetermined film; and
   a bonding step of bonding the resultant film with recording unit onto a surface of a substrate with a track groove, the substrate having a thin film layer formed on a surface;
   wherein a material forming the thin film layer has an optical property different from that of a material forming the substrate.

13. The method for manufacturing an information recording medium according to claim 12, wherein the film with recording unit is formed so as to be larger than an outer shape of the substrate; the method further comprising:
   a step of cutting the film with recording unit in conformity with the outer shape of the substrate after the bonding step.

14. The method for manufacturing an information recording medium according to claim 12, wherein the film with recording unit forming step includes:
   a first step of applying a recording layer formation material or an intermediate layer formation material onto a surface of the film;
   a second step of having the applied material dried or cured;
   a third step of applying the recording layer formation material or the intermediate layer formation material onto a surface of the recording layer or a surface of the intermediate layer formed by being dried or cured; and
   a fourth step of having any of the applied materials dried or cured; and
   wherein the third and the fourth steps are repeated more than once to form a plurality of layers such that the recording layers and the intermediate layers are laminated one on another.

15. The method of manufacturing the information recording medium according to claim 12, wherein the film with recording unit forming step includes:
   a first step of applying a recording layer formation material or an intermediate layer formation material onto a surface of the film;
   a second step of applying the recording layer formation material or the intermediate layer formation material onto a surface of the applied recording layer formation material or a surface of the applied intermediate layer formation material;
   a third step of further alternatively applying the recording layer formation material or the intermediate layer formation material onto a surface of the recording layer formation material or a surface of the intermediate layer formation material applied in the second step more than once; and
   a fourth step of having the applied recording layer formation material and the applied intermediate layer formation material dried or cured after the third step.

16. The method for manufacturing an information recording medium according to claim 12, comprising a step of further applying a critical surface separating layer for maintaining a critical surface between the recording layer formation material and the intermediate layer material onto a surface of the recording layer formation material or a surface of the intermediate layer material applied in the first step and the second step.

17. An optical information recording/reproducing device comprising:
   a recording light source for irradiating recording light; a reproduction light source for irradiating reproduction light; an objective lens for condensing the recording light and the reproduction light irradiated from the recording light source and the reproduction light source onto a predetermined recording layer of the information recording medium according to claim 1; and a light detector for detecting reflected light from the recording layer;
   wherein a focus servo is performed, upon recording, using the reflected light generated by the recording light irradiated from the recording light source condensed and incident onto the predetermined recording layer of the information recording medium, and a recording pit is recorded by using a two photon absorption phenomenon; and
   wherein a focus servo is performed, upon reproducing, using the reflected light generated by the reproduction light irradiated from the reproduction light source condensed and incident onto a predetermined recording layer of the information recording medium, and a recording pit is reproduced by using a difference of a reflectance based on a variation of an optical constant of the recording layers.

18. The optical information recording/reproducing device according to claim 17, wherein the recording light source is a semiconductor laser light source which generates pulse light, in which a pulse width varies within a range between 1 nanosecond and 100 nanoseconds in accordance with a recording mark.

19. The optical information recording/reproducing device according to claim 17, wherein the recording light source and the reproduction light source are a common light source.

20. The optical information recording/reproducing device according to claim 17, wherein the wavelength of the recording light is larger than the wavelength of the reproduction light.

21. The optical information recording/reproducing device according to claim 17,
   wherein, if a difference between a refractive index of the unrecorded region of the information recording medium and a refractive index of the intermediate layers is larger than a difference between a refractive index of the recorded region and a refractive index of the intermediate layers, a recording pit is three-dimensionally recorded in series from a recording layer nearest to the objective lens; and wherein, if a difference between a refractive index of the unrecorded region and a refractive index of the intermediate layers is smaller than a difference between a refractive index of the recorded region and a refractive index of the intermediate layers, a recording pit is three-dimensionally recorded in series from a recording layer farthest from the objective lens.

22. The optical information recording/reproducing device according to claim 17, further comprising:

a track guide illumination light generation means;

wherein track guide illumination light generated from the track guide illumination light generation means is condensed upon a track groove of the information recording medium, and a track servo of the reproduction light or the recording light is performed using diffracted reflection light from the track groove.

23. The optical information recording/reproducing device according to claim 17, wherein the output intensity of the recording light or the reproduction light is controlled such that the further the distance of the recording layer from the substrate, the larger the increase in the output intensity of the recording light or the reproduction light.

24. An optical information recording/reproducing device comprising:

a recording light source for irradiating recording light; a reproduction light source for irradiating reproduction light; an objective lens for condensing the recording light and the reproduction light irradiated from the recording light source and the reproduction light source onto a predetermined recording layer of the information recording medium according to claim 3; and a light detector for detecting reflected light from the recording layer;

wherein a focus servo is performed, upon recording, using the reflected light generated by the recording light irradiated from the recording light source condensed and incident onto the predetermined recording layer of the information recording medium, and a recording pit is recorded by using a two photon absorption phenomenon; and wherein a focus servo is performed, upon reproducing, using the reflected light generated by the reproduction light irradiated from the reproduction light source condensed and incident onto a predetermined recording layer of the information recording medium, and a recording pit is reproduced by using a difference of a reflectance based on a variation of an optical constant of the recording layers.

25. An optical information recording/reproducing device comprising:

a recording light source for irradiating recording light; a reproduction light source for irradiating reproduction light; an objective lens for condensing the recording light and the reproduction light irradiated from the recording light source and the reproduction light source onto a predetermined recording layer of the information recording medium according to claim 8; and a light detector for detecting reflected light from the recording layer;

wherein a focus servo is performed, upon recording, using the reflected light generated by the recording light irradiated from the recording light source condensed and incident onto the predetermined recording layer of the information recording medium, and a recording pit is recorded by using a two photon absorption phenomenon; and wherein a focus servo is performed, upon reproducing, using the reflected light generated by the reproduction light irradiated from the reproduction light source condensed and incident onto a predetermined recording layer of the information recording medium, and a recording pit is reproduced by using a difference of a reflectance based on a variation of an optical constant of the recording layers.

* * * * *